US009231511B2

(12) United States Patent
Hachiya et al.

(10) Patent No.: US 9,231,511 B2
(45) Date of Patent: Jan. 5, 2016

(54) CONTROL DEVICE OF AC ROTATING MACHINE

(71) Applicants: Yosuke Hachiya, Tokyo (JP); Masato Ito, Tokyo (JP); Satoru Terashima, Tokyo (JP)

(72) Inventors: Yosuke Hachiya, Tokyo (JP); Masato Ito, Tokyo (JP); Satoru Terashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 14/369,822

(22) PCT Filed: Oct. 19, 2012

(86) PCT No.: PCT/JP2012/077129
§ 371 (c)(1),
(2) Date: Jun. 30, 2014

(87) PCT Pub. No.: WO2013/114688
PCT Pub. Date: Aug. 8, 2013

(65) Prior Publication Data
US 2014/0340018 A1    Nov. 20, 2014

(30) Foreign Application Priority Data

Feb. 2, 2012 (JP) .................................. 2012-020459

(51) Int. Cl.
*H02P 21/00* (2006.01)
*H02P 6/18* (2006.01)
*H02P 21/14* (2006.01)

(52) U.S. Cl.
CPC .............. *H02P 21/0039* (2013.01); *H02P 6/18* (2013.01); *H02P 21/146* (2013.01); *H02P 2203/03* (2013.01); *H02P 2203/11* (2013.01)

(58) Field of Classification Search
CPC .................................. H02P 6/00; H02K 29/06
USPC ............. 318/400.01, 400.02, 400.07, 400.09, 318/400.14, 400.2, 400.32, 400.33, 700, 318/701, 714, 715, 721, 778, 779, 799, 800, 318/801, 808, 812, 430, 432, 437; 388/800, 388/815, 823, 854; 335/231
See application file for complete search history.

(56) References Cited

U.S. PATENT DOCUMENTS 6,005,365 A * 12/1999 Kaneko et al. ................. 318/700
7,443,130 B2 * 10/2008 Takao et al. .................... 318/806
(Continued)

FOREIGN PATENT DOCUMENTS

JP    2000 102300    4/2000
JP    3312472    8/2002
(Continued)

OTHER PUBLICATIONS

International Search Report Issued Jan. 22, 2013 in PCT/JP12/077129 filed Oct. 19, 2012.

*Primary Examiner* — Antony M Paul
(74) *Attorney, Agent, or Firm* — Oblon, McClelland, Maier & Neustadt, L.L.P.

(57) ABSTRACT

A control device of an AC rotating machine includes a controller receiving a current vector instruction and a detection current vector as inputs and outputs a voltage vector instruction to the AC rotating machine, an alternating current amplitude computation mechanism computing an alternating current amplitude of at least one of a parallel component and an orthogonal component with respect to the voltage vector instruction, an alternating current amplitude instruction generator generating an alternating current amplitude instruction from the current vector instruction, and a magnetic-pole position computation mechanism computing an estimated magnetic-pole position of the AC rotating machine. The magnetic-pole position computation mechanism computes the estimated magnetic-pole position so that the alternating current amplitude coincides with the alternating current amplitude instruction.

9 Claims, 24 Drawing Sheets

(56) References Cited

U.S. PATENT DOCUMENTS

| | | | |
|---|---|---|---|
| 8,610,388 B2* | 12/2013 | Ito et al. | 318/400.32 |
| 2004/0113582 A1 | 6/2004 | Ide | |
| 2008/0111516 A1 | 5/2008 | Inokuma | |
| 2011/0304290 A1 | 12/2011 | Ito et al. | |

FOREIGN PATENT DOCUMENTS

| | | |
|---|---|---|
| JP | 2002 291283 | 10/2002 |
| JP | 2008 125260 | 5/2008 |
| JP | 2010 109520 | 9/2010 |

* cited by examiner

CONTROL DEVICE OF AC ROTATING MACHINE

TECHNICAL FIELD

The present invention relates to a control device of an AC rotating machine capable of obtaining a rotor position of an AC rotating machine, such as an induction machine and a synchronous machine, without using a position sensor.

BACKGROUND ART

In the control of an AC rotating machine, a speed sensor or a position sensor is normally used in order to rotate the rotating machine at a desired output or rotational speed. This method involving attachment of these sensors, however, increases the cost and deteriorates performance due to wiring. Hence, there is a problem that this method is disadvantageous in fault tolerance and maintenance. To overcome this problem, there are proposed methods of detecting a magnetic-pole position and a rotational speed of the AC rotating machine without using a sensor.

Of these methods, there is a method using an inductive voltage and this method is chiefly advantageous in an operation in a high-speed region in which the inductive voltage is high. Meanwhile, for a speed region in which it is difficult to use an inductive voltage, such as a zero speed or low speed region, there is a technique of estimating a magnetic-pole position using saliency of an inductance by superimposing a voltage or a current at a frequency different from a fundamental frequency on the AC rotating machine.

For example, the invention described in PTL 1 discloses a method of estimating a magnetic-pole position by applying a high-frequency alternating voltage to the AC rotating machine so that an amplitude of a high-frequency current flowing in an orthogonal direction of the applied voltage becomes 0.

The invention described in PTL 2 discloses an estimation method as follows. That is, a high-frequency current value obtained by applying a high-frequency alternating voltage to the rotating machine is transformed to a d-q axis coordinate with a 45° phase shift from an estimated angle. A magnetic-pole position is then estimated so that the high-frequency impedances Zdm and Zqm obtained from the transformation result coincide with each other. Further, a correction under high load is made by subtracting a compensation angle $\hat{\theta}r$ computed by multiplying a torque component of a current instruction value by a proportional constant from the estimated magnetic-pole position. An estimated position $\hat{\theta}c$ is thus computed.

CITATION LIST

Patent Literature

PTL 1: Japanese Patent No. 3312472
PTL 2: JP-A-2002-291283
PTL 3: Japanese Patent No. 4672236

SUMMARY OF INVENTION

Technical Problem

The invention described in PTL 1 adjusts the axis to which is applied a high-frequency alternating voltage so that the amplitude of the orthogonal component in the direction in which to apply the high-frequency alternating voltage becomes 0. Accordingly, when the inductance magnetically saturates while a load current is flowing, the estimated position deviates from the actual magnetic-pole position.

Also, the invention described in PTL 2 applies a high-frequency alternating voltage to the axis such that the high-frequency impedances coincide with each other. Hence, the axis to which is applied the high-frequency alternating voltage and the axis on which no torque is generated coincide with each other under no load. However, the axis to which is applied the high-frequency alternating voltage deviates from the axis on which no torque is generated under load, and there is a problem that such a deviation causes vibrations and noises.

Solution to Problem

A control device of an AC rotating machine of the invention includes: current vector detection means for detecting a current vector of the AC rotating machine; control means for receiving a current vector instruction and the detection current vector as inputs and outputting a voltage vector instruction obtained by adding a fundamental voltage vector instruction to drive the AC rotating machine and an alternating voltage vector instruction alternating to an arbitrary axis; voltage application means for applying a voltage to the AC rotating machine according to the voltage vector instruction; alternating current amplitude computation means for receiving a current vector detected by the current vector detection means as an input and computing an alternating current amplitude of at least one of a parallel component and an orthogonal component with respect to the alternating voltage vector instruction; alternating current amplitude instruction generation means for generating an alternating current amplitude instruction from the current vector instruction; and magnetic-pole position computation means for computing an estimated magnetic-pole position of the AC rotating machine. The control device is characterized in that the magnetic-pole position computation means computes the estimated magnetic-pole position so that the alternating current amplitude coincides with the alternating current amplitude instruction.

Advantageous Effects of Invention

According to the invention, by computing the estimated position so that the alternating current amplitude coincides with the alternating current amplitude instruction, the magnetic-pole position can be estimated while a high-frequency alternating voltage applied to estimate a magnetic-pole position is kept applied always to an axis on which no torque is generated. Moreover, because there is no influence of an error of the estimated position caused by magnetic saturation, vibrations and noises of the rotating machine can be suppressed.

DESCRIPTION OF EMBODIMENTS

First Embodiment

Figure 1:
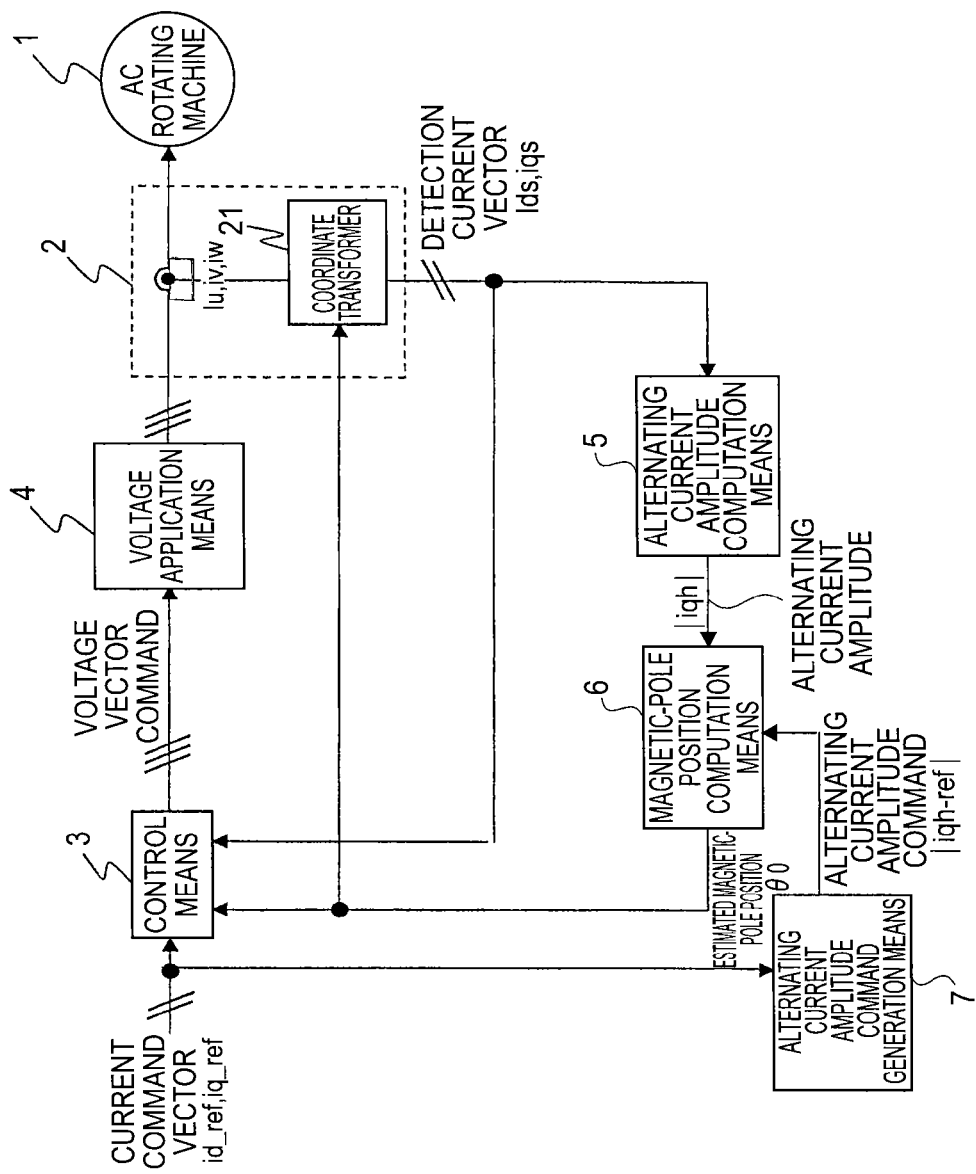
FIG. 1 is a view showing an overall configuration of a control device of an AC rotating machine of a first embodiment.

FIG. 1 is a view showing an overall configuration of a control device of an AC rotating machine according to a first embodiment of the invention. Referring to the drawing, an AC rotating machine 1 is a synchronous motor, and herein a synchronous machine using permanent magnets. This embodiment will describe a synchronous motor by way of example. It should be appreciated, however, that the control device can be also formed on the same principle for other types of rotating machine.

Connected to the AC rotating machine 1 are current vector detection means 2 for detecting a current vector of the AC rotating machine 1 and voltage application means 4 for applying a voltage and corresponding to a power converter, such as an inverter.

The current vector detection means 2 detects currents of three phases, iu, iv, and iw, of the AC rotating machine 1, and applies coordinate transformation to the detected currents to obtain a current on a d-q axis known as an orthogonal coordinate rotating in synchronization with a rotor of the AC rotating machine 1 by means of a coordinate transformer 21 using an estimated magnetic-pole position θ0 described below. The current thus obtained is outputted as a detection current vector (ids, iqs).

In order to detect currents of three phases, currents of all the three phases may be detected. Alternatively, currents of three phases may be found by detecting currents of two phases on the ground that a sum of currents of three phases is zero. Further, currents of three phases may be computed on the basis of an inverter bus current or currents flowing through switching elements and states of the switching elements.

Figure 2:
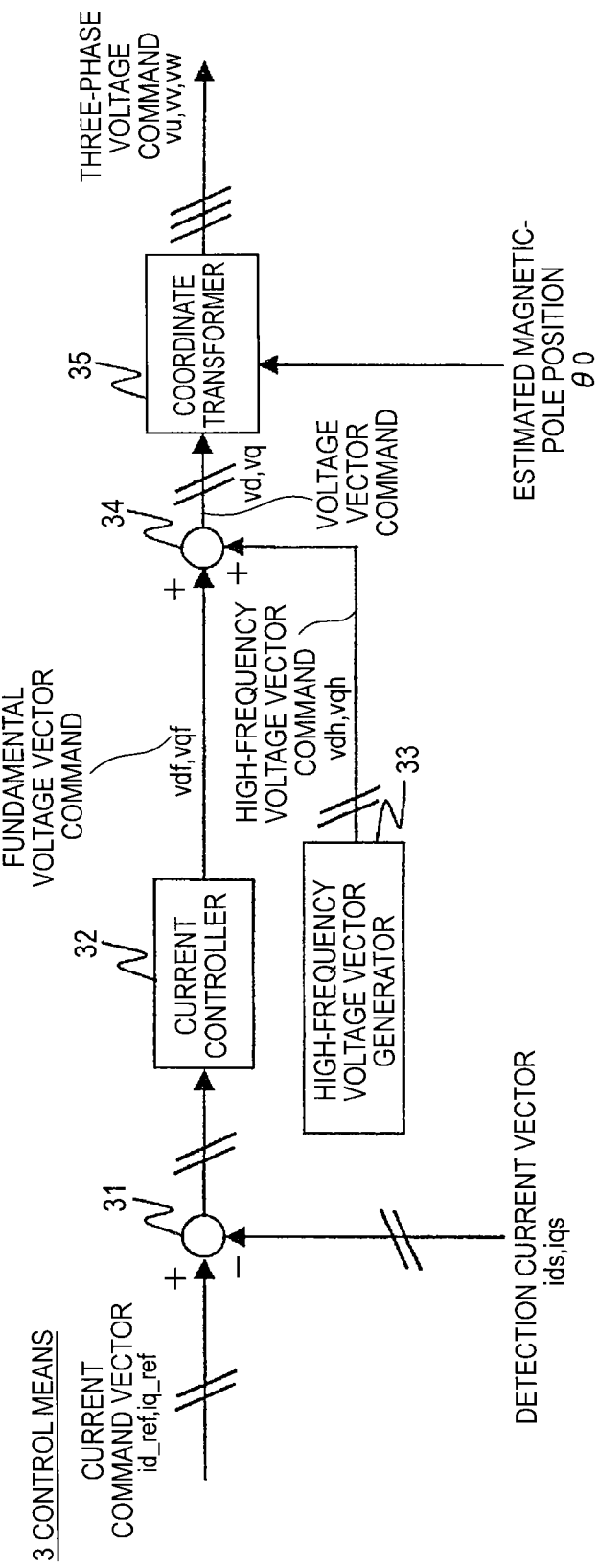
FIG. 2 is a schematic configuration view used to describe an internal configuration of control means 3 of the first embodiment.

As is shown in a configuration view of FIG. 2 in detail, the control means 3 subtracts the detection current vector (ids, iqs) from a current vector instruction (id_ref, iq_ref) given from the outside by means of an adder-subtractor 31. A current controller 32 outputs a fundamental voltage vector instruction (vdf, vqf) by performing proportional-plus-integral control so that there is no deviation between the current vector instruction, which is an output of the adder-subtractor 31, and the detection current vector. A high-frequency alternating voltage vector generator 33 outputs a high-frequency alternating voltage vector instruction (vdh, vqh) on the d-q axis.

In this embodiment, vqh=0 is given so that an alternating voltage is applied to the d-axis direction alone. The adder-subtractor 34 outputs a voltage vector instruction (vd, vq), which is obtained by adding the fundamental voltage vector instruction and the high-frequency alternating voltage vector instruction. A coordinate transformer 35 transforms the voltage vector instruction (vd, vq), which is an output of the adder-subtractor 34, to a three-phase voltage vector instruction (vu, vv, vw) by transformation from d-q axis to a stationary coordinate using the estimated position θ0 and outputs the transformation result.

In this embodiment, the control means 3 adopts the method of generating a voltage instruction vector using the proportional-plus-integral control. It should be appreciated, however, that the control means 3 adopting, for example, the V/f control can be also formed on the same principle by adding the high-frequency alternating voltage vector instruction.

The voltage application means 4 is a power converter, such as an inverter, and applies a voltage to the AC rotating machine 1 according to a voltage vector instruction outputted from the control means 3. As is shown in a configuration view of FIG. 3 in detail, the alternating current amplitude computation means 5 extracts a high-frequency current vector obtained from the detection current vector by means of a filter 51, computes an amplitude of an orthogonal component of a high-frequency current by means of an orthogonal component extraction unit 52, and outputs the computation result as an alternating current amplitude.

Figure 4:
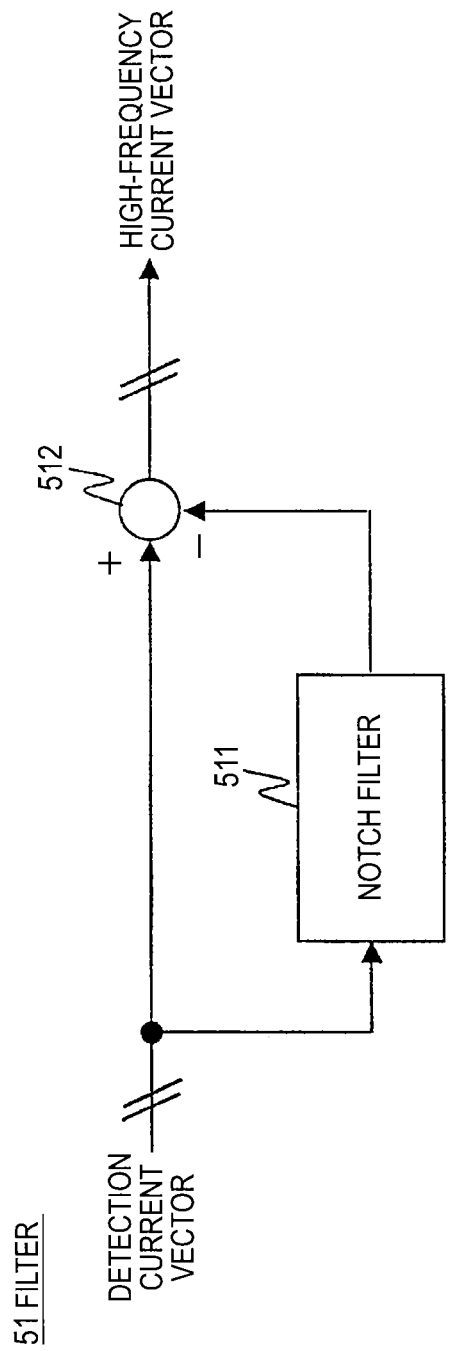
FIG. 4 is a view used to describe an internal configuration of a filter 51 of FIG. 3.

The filter 51 is a filter that extracts a high-frequency current vector from a detection current vector and can be of any type of filter as long as the filter is capable of extracting a frequency component same as that of the high-frequency alternating voltage vector instruction (vdh, vqh) from the detection current vector. For example, as is shown in FIG. 4, the high-frequency current vector is extracted using a notch filter 511 known as a band-stop filter with a narrow stop-band. The notch filter 511 of FIG. 4 applies notch filtering to remove an angular frequency ωh of the high-frequency alternating voltage vector expressed by Equation (1) as below to the detection current vector and removes a component of the angular frequency ωh from the detection current vector. An adder-subtractor 512 computes a high-frequency current vector of the component of the angular frequency ωh from the detection current vector by subtracting an output of the notch filter 511 from the detection current vector. In Equation (1) below, is a Laplace operator and qx is a notch depth.

[Math. 1]

$$\frac{s^2 + \omega_h^2}{s^2 + \frac{\omega_h}{q_x}s + \omega_h^2} = \quad (1)$$

Figure 3:
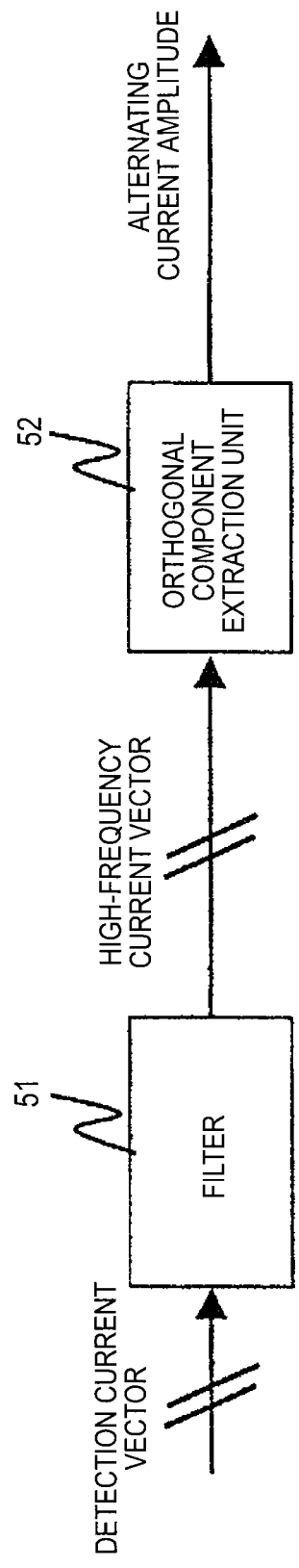
FIG. 3 is a schematic configuration view showing an internal configuration of alternating current amplitude computation means 5 of the first embodiment.
Figure 5:
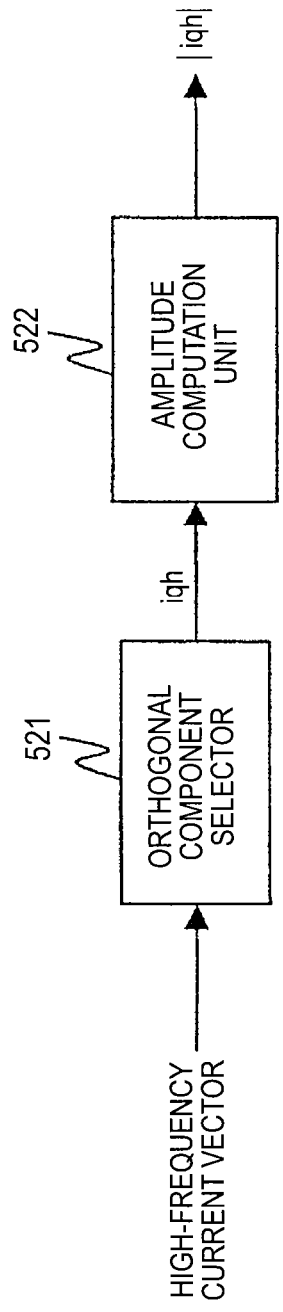
FIG. 5 is a view used to describe an internal configuration of an orthogonal component extraction unit 52 of FIG. 3.

FIG. 5 is a view showing a configuration of the orthogonal component extraction unit 52 of FIG. 3. The orthogonal component extraction unit 52 selects only iqh, which is a high-frequency current vector in the direction orthogonal to the d axis, by multiplying the high-frequency current vector (idh, iqh) by a matrix $(0, 1)^T$ by means of an orthogonal component selector 521. An amplitude computation unit 522 outputs |iqh|, which is the magnitude (amplitude) of iqh computed in accordance with Equation (2) as below. In Equation (2) below, T is a cycle of iqh.

[Math. 2]

$$|i_{qh}| = \sqrt{\frac{2}{T}\int_0^T i_{qh}^2\, dt} \quad (2)$$

The above has described the configuration of the alternating current amplitude computation means 5.

Referring to FIG. 1 again, the magnetic-pole position computation means 6 computes an estimated magnetic-pole position according to the alternating current amplitude and an alternating current amplitude instruction outputted from the alternating current amplitude instruction generation means 7 described below.

Firstly, a method of computing a magnetic-pole position by applying a high-frequency alternating voltage will be described. A description is first given to a mathematical formula expressing a high-frequency current vector flowing through the AC rotating machine 1 when the high-frequency alternating voltage vector generator 33 described above outputs the high-frequency alternating voltage vectors vdh and vqh.

Figure 6:
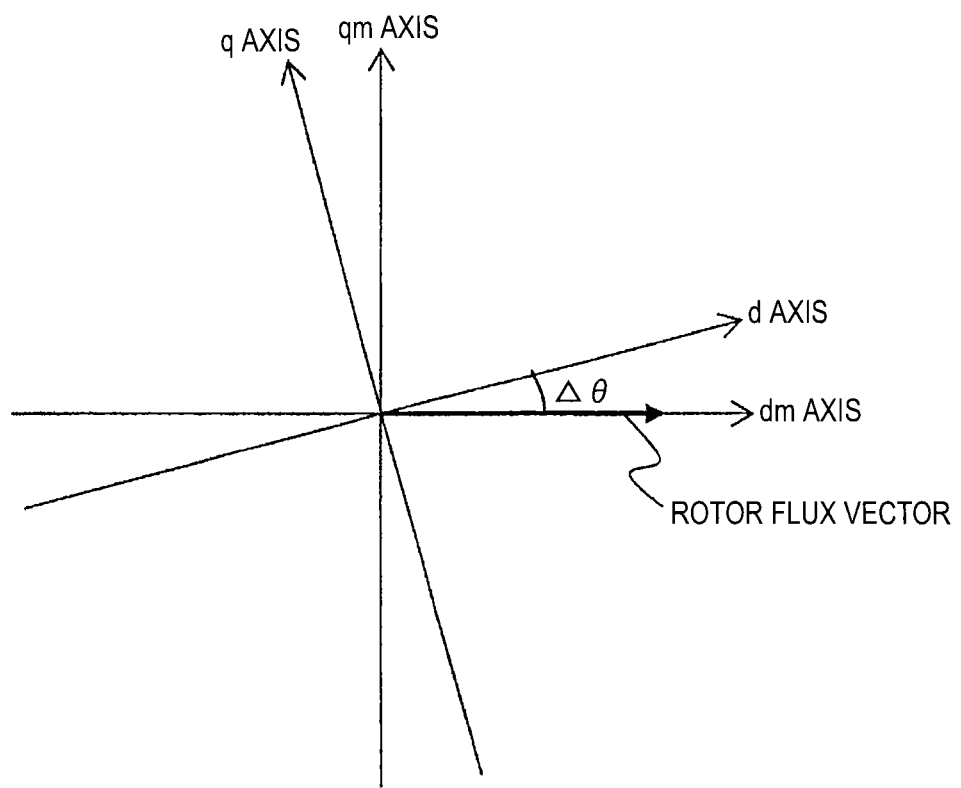
FIG. 6 is a view used to describe an operation of the AC rotating machine of the first embodiment by means of vector.

As is shown in FIG. 6, let a dm axis be a rotor flux vector direction, a qm axis be a direction orthogonal to the dm axis, a d axis be a direction indicated by the estimated magnetic-pole position θ0 obtained by applying the high-frequency alternating voltage vector, and a q axis be a direction orthogonal to the d axis. Also, let Δθ be a deviation between the d axis and the dm axis. FIG. 6 shows a state when the AC rotating machine 1 is under no load and an operation is performed so that the d axis steadily coincides with the dm axis. FIG. 6 is a view showing a case where a deviation Δθ is generated instantaneously. In this instance, a mathematical formula of the AC rotating machine 1 when the high-frequency alternating voltage vectors vdh and vqh are applied to the d axis and the q axis, respectively, is expressed by Equation (3) as below. In the equation, P is a differential operator.

[Math. 3]

$$\begin{bmatrix} v_{dh} \\ v_{qh} \end{bmatrix} = \begin{bmatrix} R + pL_{dc} - \omega_r L_{dqc} & pL_{dqc} - \omega_r L_{qc} \\ pL_{dqc} - \omega_r L_{qc} & R + pL_{dc} - \omega_r L_{dqc} \end{bmatrix} \begin{bmatrix} i_{dh} \\ i_{qh} \end{bmatrix} + \quad (3)$$

$$\omega_r \phi_j \begin{bmatrix} -\sin\Delta\theta \\ \cos\Delta\theta \end{bmatrix}$$

where $$\begin{pmatrix} L_{dc} = L - l\cos 2\Delta\theta,\ L_{qc} = L + l\cos 2\Delta \\ L_{dqc} = l\sin 2\Delta\theta \\ L = \frac{L_d + L_q}{2},\ l = \frac{L_q - L_d}{2} \end{pmatrix},$$

R is a stator winding resistance of the AC rotating machine 1, $L_d$ is an inductance in the dm-axis direction, $L_q$ is an inductance in the qm-axis direction, Δθ is a deviation between the position of the dm axis and the position of the d axis, $\omega_r$ is a rotational speed, $\phi_f$ is the magnitude of the rotor flux vector, $i_{dh}$ is a d-axis high-frequency current, and $i_{qh}$ is a q-axis high-frequency current.

In a case where the magnetic-pole position is detected using a high-frequency alternating voltage, a high speed region is disadvantageous in terms of operation efficiency, a voltage utilization ratio, and a maximum current because a voltage and a current at a high frequency are generated. It is therefore preferable to use the high-frequency alternating voltage at a zero speed or a low speed. Also, it is preferable to employ magnetic-pole position detection means using a known adaptive observation unit in the high speed region. Such being the case, assume herein that a high-frequency voltage is used at a zero speed to a low speed. Then, given rotational speed ωr≈0, we obtain Equation (4) as below from Equation (3) above.

[Math. 4]

$$\begin{bmatrix} v_{dh} \\ v_{qh} \end{bmatrix} = R\begin{bmatrix} i_{dh} \\ i_{qh} \end{bmatrix} + p\begin{bmatrix} L_{dc} & L_{dqc} \\ L_{dqc} & L_{qc} \end{bmatrix}\begin{bmatrix} i_{dh} \\ i_{qh} \end{bmatrix} \quad (4)$$

Further, the right-hand second term is a differential of the high-frequency current. Because the differential of the high-frequency current is increased by a factor of the angular frequency ωh of the high-frequency voltage, we obtain, right-hand second term>>right-hand first term, and therefore the right-hand first term can be disregarded. Consequently, Equation (5) as below can be obtained.

[Math. 5]

$$p\begin{bmatrix} i_{dh} \\ i_{qh} \end{bmatrix} = \frac{1}{L^2 - l^2}\begin{bmatrix} L + l\cos 2\Delta\theta & -l\sin 2\Delta\theta \\ -l\sin 2\Delta\theta & L - l\cos 2\Delta\theta \end{bmatrix}\begin{bmatrix} v_{dh} \\ v_{qh} \end{bmatrix} \quad (5)$$

Assume that high-frequency voltage vector is given by Equation (6) as below. Then, by substituting Equation (6) below into Equation (5) above and integrating the both sides, the high-frequency current vectors idh and iqh are expressed by Equation (7) as below.

[Math. 6]

$$v_{dh} = V_h \sin\omega_h t \quad (6)$$
$$v_{qh} = 0$$

[Math. 7]

$$\begin{bmatrix} i_{dh} \\ i_{qh} \end{bmatrix} = \frac{-V_h}{\omega_h(L^2-l^2)} \begin{bmatrix} L+l\cos2\Delta\theta & -l\sin2\Delta\theta \\ -l\sin2\Delta\theta & L-l\cos2\Delta\theta \end{bmatrix} \begin{bmatrix} \cos\omega_h t \\ 0 \end{bmatrix} \quad (7)$$
$$= \frac{-V_h}{\omega_h(L^2-l^2)} \begin{bmatrix} L+l\cos2\Delta\theta \\ -l\sin2\Delta\theta \end{bmatrix} \cos\omega_h t$$

In order to estimate the magnetic-pole position, $\theta 0$ such that the deviation $\Delta\theta$ becomes 0 is computed. By using an amplitude component of the high-frequency current of Equation (7) above, $\Delta\theta$ can be expressed as a function of the current amplitude. Herein, by using the amplitude of the orthogonal component iqh, |iqh|, of the high-frequency current, Equation (8) as below can be obtained from Equation (7) above.

[Math. 8]

$$|i_{qh}| = \frac{V_h l}{\omega_h(L^2-l^2)} \sin2\Delta\theta \quad (8)$$

Also, Equation (8) can be rewritten to Equation (9) as below with respect to $\Delta\theta$.

[Math. 9]

$$\Delta\theta = \frac{\sin^{-1}\left\{\frac{|i_{qh}|\omega_h(L^2-l^2)}{V_h l}\right\}}{2} \quad (9)$$

It is understood from Equation (9) above that approximating $\Delta\theta$ to zero is equal to approximating |iqh| to zero. Hence, the estimated position $\theta 0$ can be expressed by Equation (10) as below using a proportional-plus-integral unit.

[Math. 10]

$$\theta_0 = \theta_0 + K_{p\theta}\left(1 + \frac{K_{i\theta}}{s}\right)(0 - |i_{qh}|) \quad (10)$$

It should be noted that the angular frequency $\omega h$ of the high-frequency voltage and the high-frequency voltage amplitude Vh can be set arbitrarily in the high-frequency alternating voltage vector generator 33 and are therefore known. Also, L and l can be found from Ld and Lq as in where clause of Equation (3) above and Ld and Lq can be found by measuring the both in advance. Hence, L and l are also known.

As has been described above, the deviation $\Delta\theta$ from the axis on which the high-frequency voltage vector is applied can be computed on the basis of |iqh|.

An error of the estimated position due to inductance magnetic saturation under load will now be described.

Figure 7:
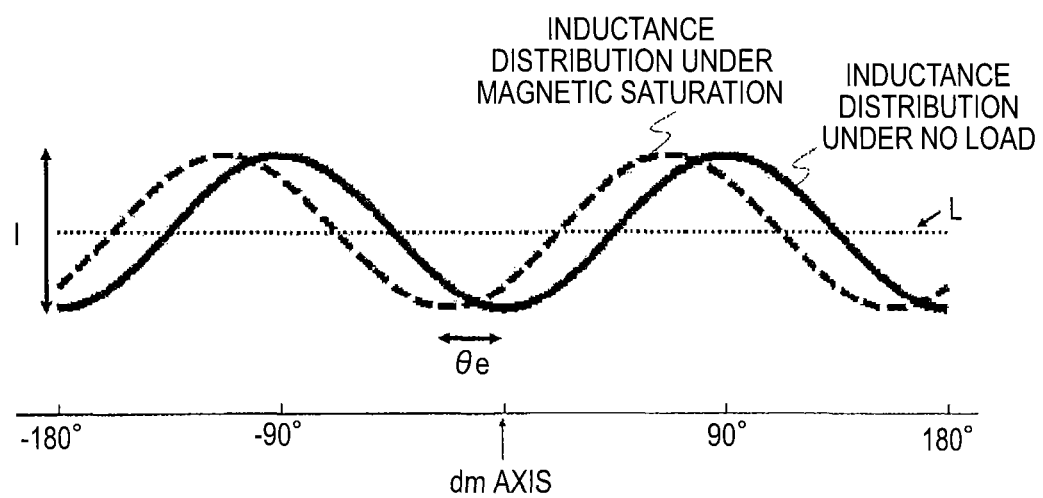
FIG. 7 is a view used to describe an operation of the AC rotating machine of the first embodiment by comparing an inductance distribution appearing under load with that under no load.

As has been described above, the inductance of the AC rotating machine magnetically saturates under load. Hence, assume that a position error $\theta e$ is generated under a specific load, as is shown in FIG. 7, then, an inductance distribution under the specific load varies by $\theta e$ from the distribution under no load. In order to express this variance by Equation (3) above, Ldc, Lqc, and Ldqc are redefined by Equation (11) as follows.

[Math. 11]

$$\begin{cases} L_{dc} = L - l\cos2(\Delta\theta - \theta_e) \\ L_{qc} = L + l\cos2(\Delta\theta - \theta_e) \\ L_{dqc} = l\sin2(\Delta\theta - \theta_e) \end{cases} \quad (11)$$

By developing Equation (3) above using Equation (11) above, Equation (12) as below can be obtained. Also, the magnitude of the high-frequency current vector iqh, |iqh|, is expressed by Equation (13) as below.

[Math. 12]

$$\begin{bmatrix} i_{dh} \\ i_{qh} \end{bmatrix} = \frac{-V_h}{\omega_h(L^2-l^2)} \begin{bmatrix} L+l\cos2(\Delta\theta-\theta_e) \\ -l\sin2(\Delta\theta-\theta_e) \end{bmatrix} \cos\omega_h t \quad (12)$$

[Math. 13]

$$|i_{qh}| = \frac{V_h l}{\omega_h(L^2-l^2)} \sin2(\Delta\theta - \theta_e) \quad (13)$$

Figure 8:
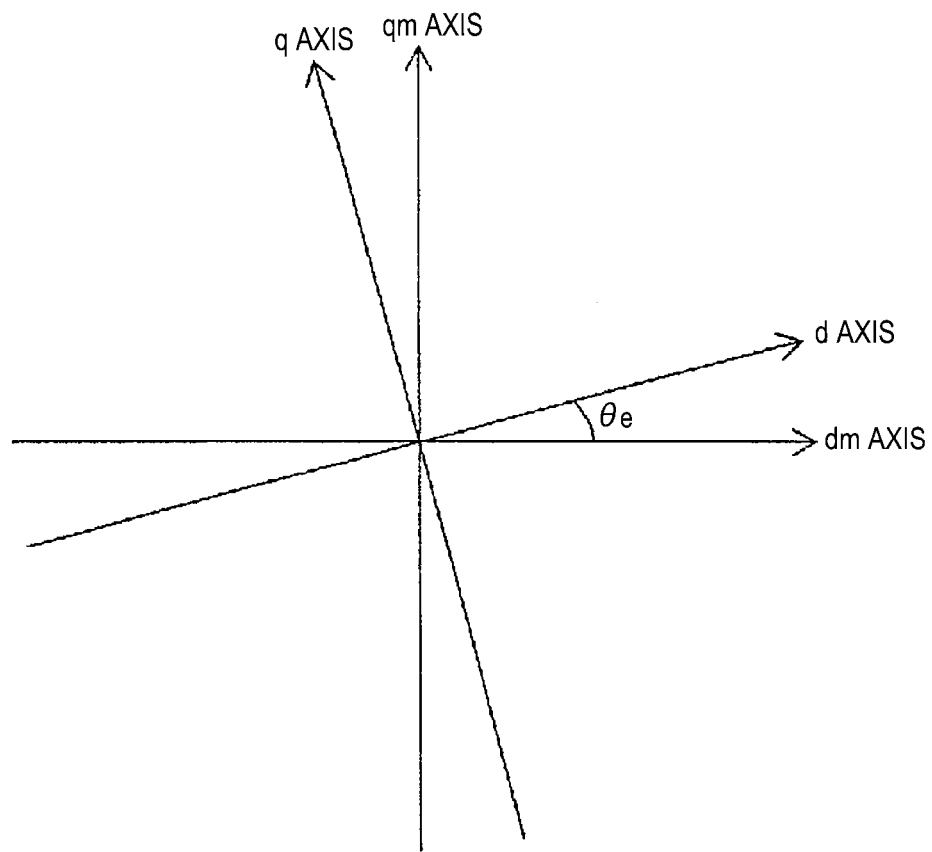
FIG. 8 is a view used to describe a state of FIG. 7 by means of vector.

By forming the proportional-plus-integral unit of Equation (10) above so that |iqh| approximates to zero, it is understood from Equation (13) above that $(\Delta\theta-\theta e)$ approximates to zero. More specifically, because $\Delta\theta$ converges to $\theta e$, as is shown in FIG. 8, the d axis indicated by the estimated magnetic-pole position $\theta 0$ is detected at a position deviated by $\theta e$ from the dm axis as the actual magnetic-pole position.

Figure 9:
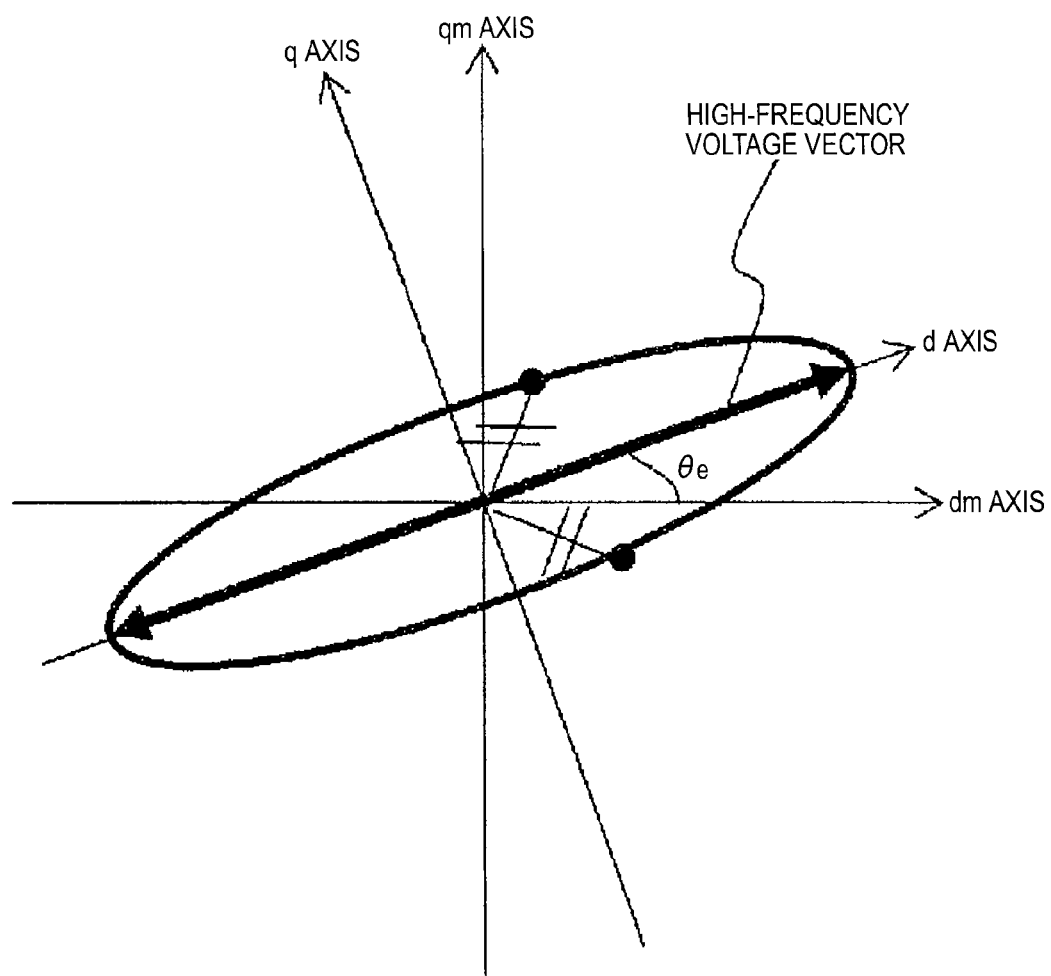
FIG. 9 is a view used to describe an operation of PTL 2.

The invention described in PTL 2 makes a compensation for the estimated magnetic-pole position using a compensation angle. However, as is shown in FIG. 9, because a high-frequency voltage is applied to an axis such that high-frequency impedances of the axes $\pm 45°$ away from the estimated magnetic-pole position $\theta 0$ coincide with each other, the axis (d axis) to which is applied a high-frequency voltage deviates from the axis (dm axis) on which no torque is generated. Such a deviation becomes a factor of vibrations and noises of the rotating machine due to a torque by a high-frequency voltage.

In order to overcome such an inconvenience, the axis to which is applied the high-frequency alternating voltage vector is always set to the dm axis in the computation of the estimated magnetic-pole position by the magnetic-pole position computation means 6, so that the occurrence of vibrations and noises of the rotating machine due to a torque by a high-frequency voltage are suppressed. This means, in short, to approximate the deviation $\Delta\theta$ between the dm axis, which is the actual magnetic-pole position, and the d axis, which is the estimated magnetic-pole position, to zero. By approximating $\Delta\theta$ to zero in Equation (13), |iqh| is expressed by Equation (14) as follows.

[Math. 14]

$$|i_{qh}| = -\frac{V_h l}{\omega_h(L^2-l^2)} \sin2\theta_e \quad (14)$$

That is to say, when the value of |iqh| approximates to a value of the right-hand side of Equation (14) above, $\Delta\theta$ approximates to zero. In this instance, because θe is unknown, the right-hand side of Equation (14) above cannot be computed in real time. However, because θe has a characteristic that it varies with the magnitude of the load current, θe can be measured in advance. Hence, an alternating current amplitude instruction |iqh_ref|, which is an output of the alternating current amplitude instruction generation means 7 described below, is set by Equation (15) as below and the estimated magnetic-pole position θ0 is formed by Equation (16) as below using a proportional-plus-integral unit so that |iqh_ref| coincides with |iqh|. Accordingly, |iqh| can be approximated to the instruction value |iqh_ref|. Consequently, not only by bringing the d axis, which is the estimated magnetic-pole position, into coincidence with the dm axis, but also by setting the dm axis as the direction to which is applied the high-frequency voltage vector, the occurrence of vibrations and noises of the rotating machine due to a torque can be suppressed. A setting method of |iqh_ref| will be described below.

[Math. 15]

$$|i_{qh\_ref}| = -\frac{V_h l}{\omega_h(L^2 - l^2)}\sin 2\theta_e \quad (15)$$

[Math. 16]

$$\theta_0 = \theta_0 + K_{p\theta}\left(1 + \frac{K_{i\theta}}{s}\right)(|i_{qh\_ref}| - |i_{qh}|) \quad (16)$$

The above has described the computation method of the magnetic-pole position estimation by the magnetic-pole position computation means 6.

A configuration of the magnetic-pole position computation means 6 will now be described.

Figure 10:
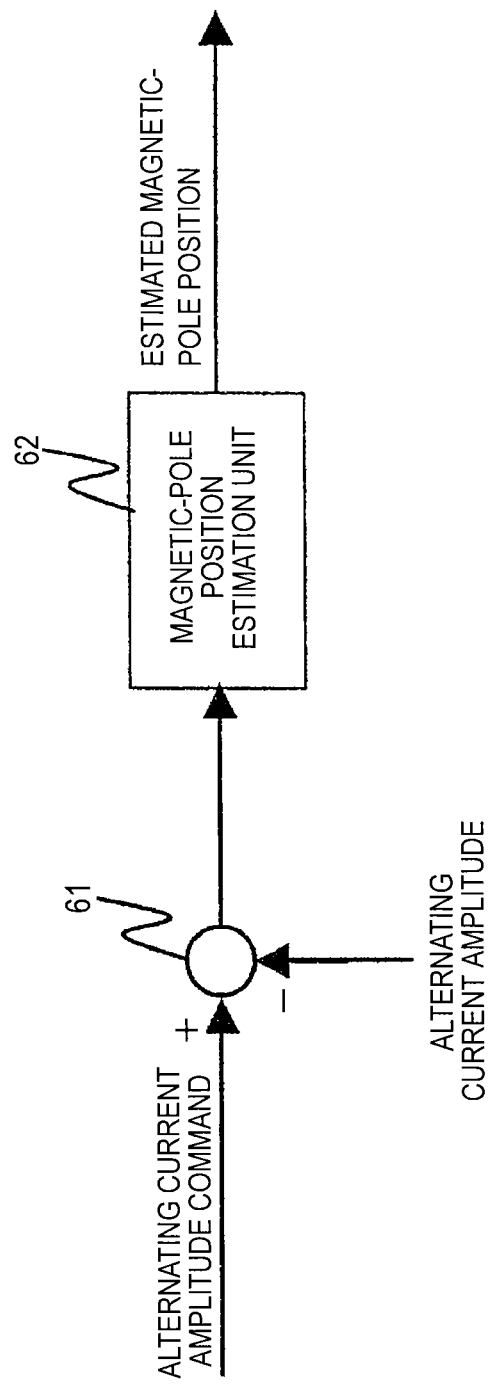
FIG. 10 is a schematic configuration view showing an internal configuration of magnetic-pole position computation means 6 of the first embodiment.

As is shown in FIG. 10, the magnetic-pole position computation means 6 is formed of an adder-subtractor 61 that outputs a deviation between the alternating current amplitude instruction and the alternating current amplitude and a magnetic-pole position estimation unit 62 that outputs an estimated magnetic-pole position from the deviation. The magnetic-pole position estimation unit 62 outputs the estimated magnetic-pole position in accordance with Equation (16) above on the basis of a deviation value inputted therein from the adder-subtractor 61. The above has described the configuration of the magnetic-pole position computation means 6.

Further, the alternating current amplitude instruction generation means 7 generates the alternating current amplitude instruction |iqh_ref| by multiplying the current vector instruction (id_ref, iq_ref) by (Kd, Kq)$^T$ (T stands for a transposed matrix), which is a transposed matrix of an amplification value (Kd, Kg). The amplification value (Kd, Kq) can take a simple constant value. Alternatively, by changing the amplification value (Kd, Kq) according to the current vector instruction using a table, the AC current amplitude instruction value can be more accurate. Also, the alternating current amplitude instruction may be generated from only a torque component of the current vector instruction by setting as Kd=0.

Regarding the amplification value, the value of |iqh| obtained in accordance with Equation (2) above when the high-frequency alternating voltage vector and the load current are applied to the AC rotating machine 1 is measured in advance, and the amplification value is determined from the current vector instruction and |iqh|. It thus becomes possible to find the current amplitude instruction value |iqh_ref| independently of unknown θe. Regarding the measurement, a instruction value for the current instruction vector may be found analytically, for example, by electromagnetic analysis or the value may be measured using the actual machine. By measuring these values in advance, these values can be immediately applied to a sensorless operation.

As has been described above, according to the configuration of this embodiment, because it becomes possible to apply the alternating voltage always to the axis on which no torque is generated using the estimated magnetic-pole position θ0 by applying the high-frequency alternating voltage vector so that the alternating current amplitude coincides with the alternating current amplitude instruction, vibrations and noises of the rotating machine can be suppressed.

Second Embodiment

The first embodiment above has described the method of estimating the magnetic-pole position using a high-frequency voltage without generating a magnetic-pole position error even under load. With this method, however, giving a high-frequency voltage in a high speed region is disadvantageous in terms of operation efficiency, a voltage utilization ratio, and a maximum current as has been described above.

In a second embodiment, the magnetic-pole position computation means 6 has an adaptive observation unit 65 in order to estimate the magnetic-pole position in all of the speed regions from a low speed to a high speed, and the magnetic-pole position is computed using the adaptive observation unit 65 in all of the speed regions. Among the speed regions, a low speed region is a region in which an inductive voltage is so small that it is difficult to compute a flux vector. Accordingly, a flux vector is computed using a high-frequency alternating voltage, so that compensation is made for the magnetic-pole position estimation in the low speed region in which the adaptive observation unit 65 is disadvantageous. It thus becomes possible to estimate the magnetic-pole position in all of the speed regions.

Figure 11:
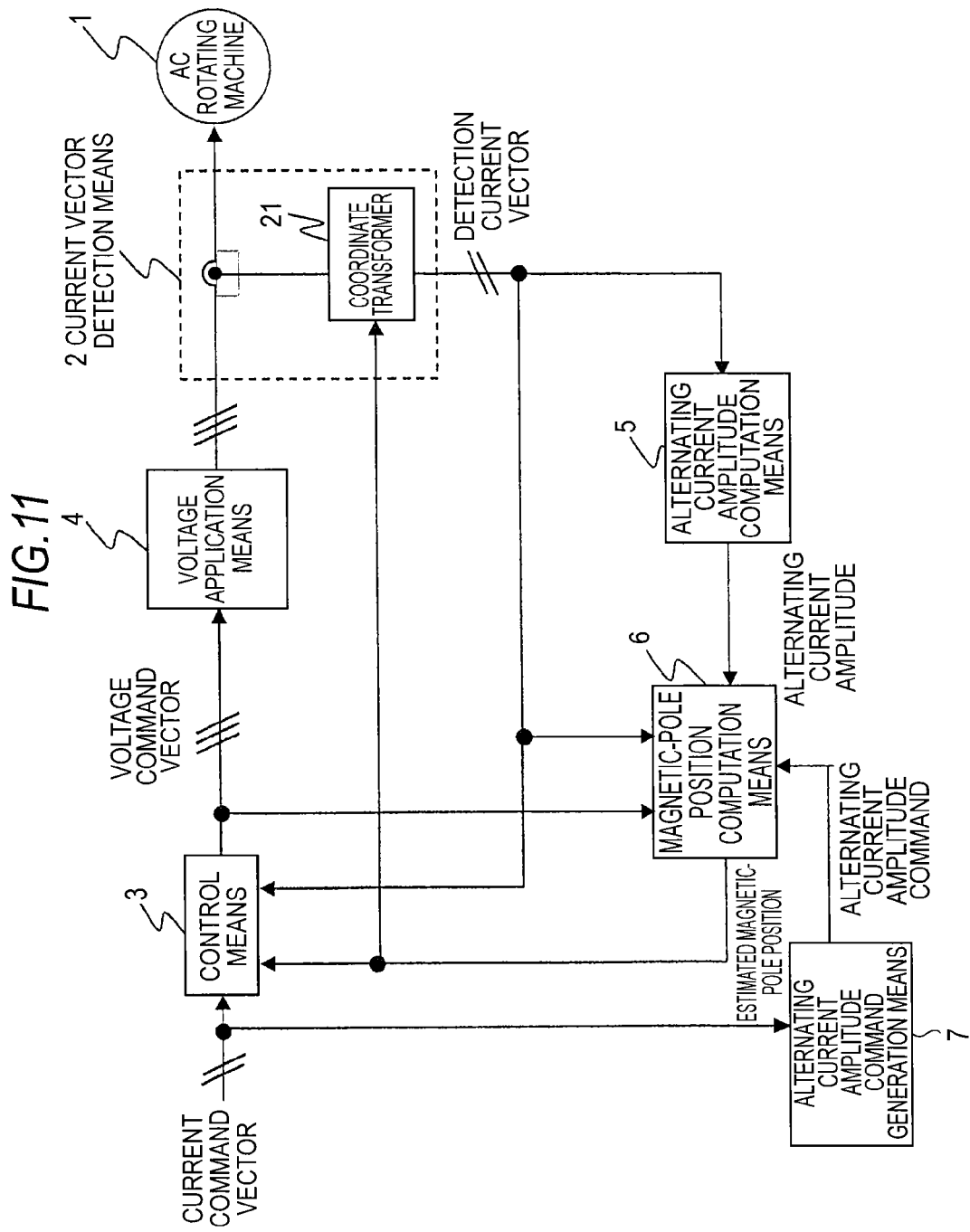
FIG. 11 is a view showing an overall configuration of a control device of an AC rotating machine of a second embodiment.
Figure 12:
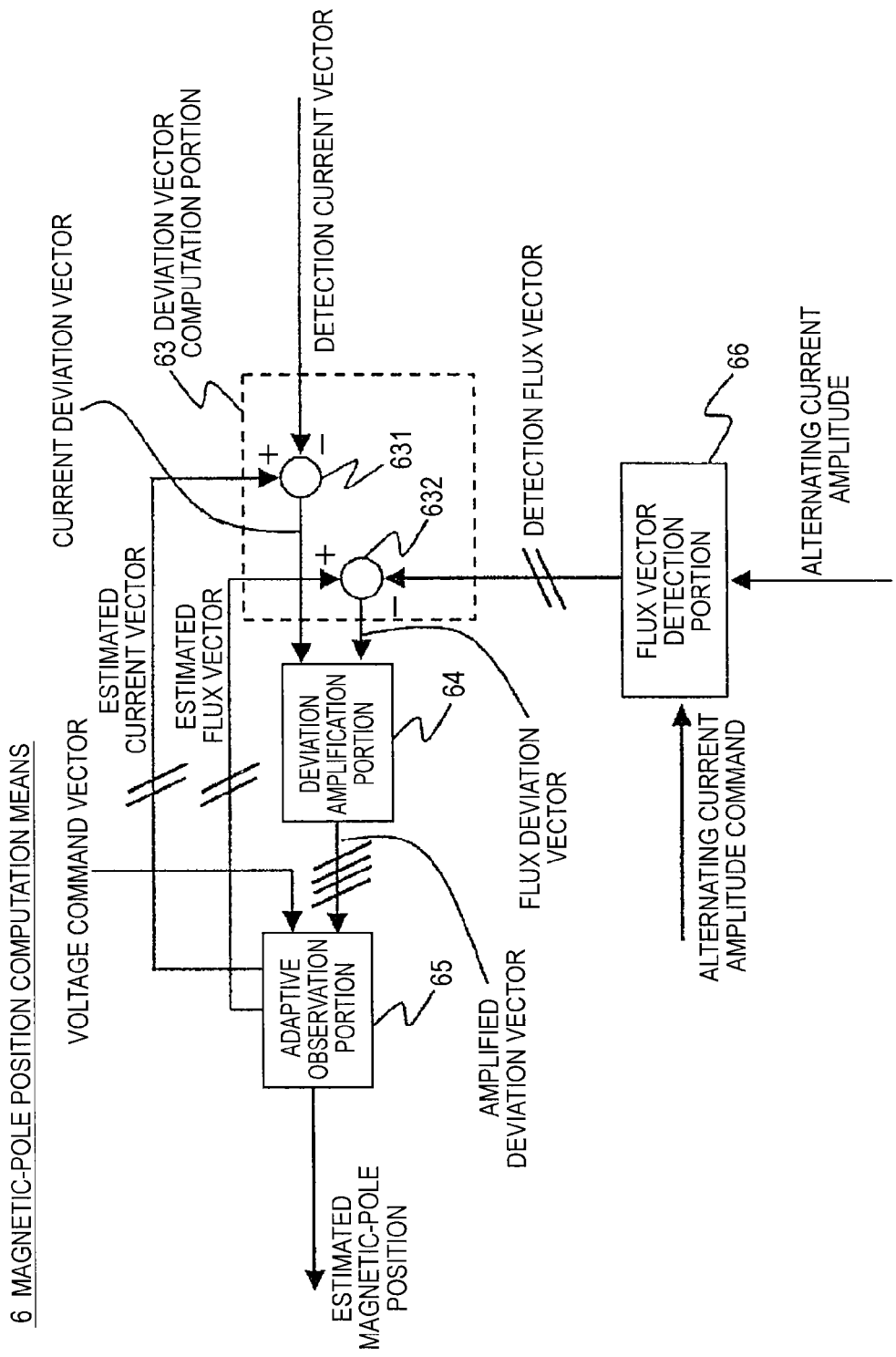
FIG. 12 is a schematic configuration view showing an internal configuration of magnetic-pole position computation means 6 of the second embodiment.

FIG. 11 shows an overall configuration of a control device of an AC rotating machine according to the second embodiment of the invention. In this embodiment, the alternating current amplitude, alternating current amplitude instruction, the voltage instruction vector, and the detection current vector are inputted into the magnetic-pole position computation means 6. The rest is the same as the configuration of the first embodiment above and a description is omitted herein. FIG. 12 shows a configuration of the magnetic-pole position computation means 6 of this embodiment.

In this embodiment, the magnetic-pole position computation means 6 has a flux vector detection portion 66 that detects a rotor flux vector from the alternating current amplitude instruction and the alternating current amplitude and outputs the detection result as a detection flux vector, a deviation vector computation portion 63 that outputs a current deviation vector, which is a deviation between an estimated current vector and the detection current vector, and a flux deviation vector, which is a deviation between an estimated flux vector and the detection flux vector, a deviation amplification portion 64 that amplifies the current deviation vector and the flux deviation vector and outputs the result as an amplified deviation vector, and the adaptive observation portion 65 that outputs an estimated current vector, an estimated flux vector, and an estimated magnetic-pole position of the AC rotating machine 1.

The deviation vector computation portion 63 outputs a current deviation vector (eids, eiqs) obtained by subtracting a detection current vector (ids, iqs), which is an output of the current vector detection means 2, from an estimated current vector (ids0, iqs0), which is an output of the adaptive observation portion 65 described below by means of an adder-subtractor 631, and outputs a flux deviation vector (eϕdr, eθqr) obtained by subtracting a detection flux vector (ϕdrD, ϕqrD), which is an output of the flux vector detection portion 66 described below, from an estimated flux vector (ϕdr0, ϕqr0), which is an output of the adaptive observation portion 65 described below by means of an adder-subtractor 632.

Figure 13:
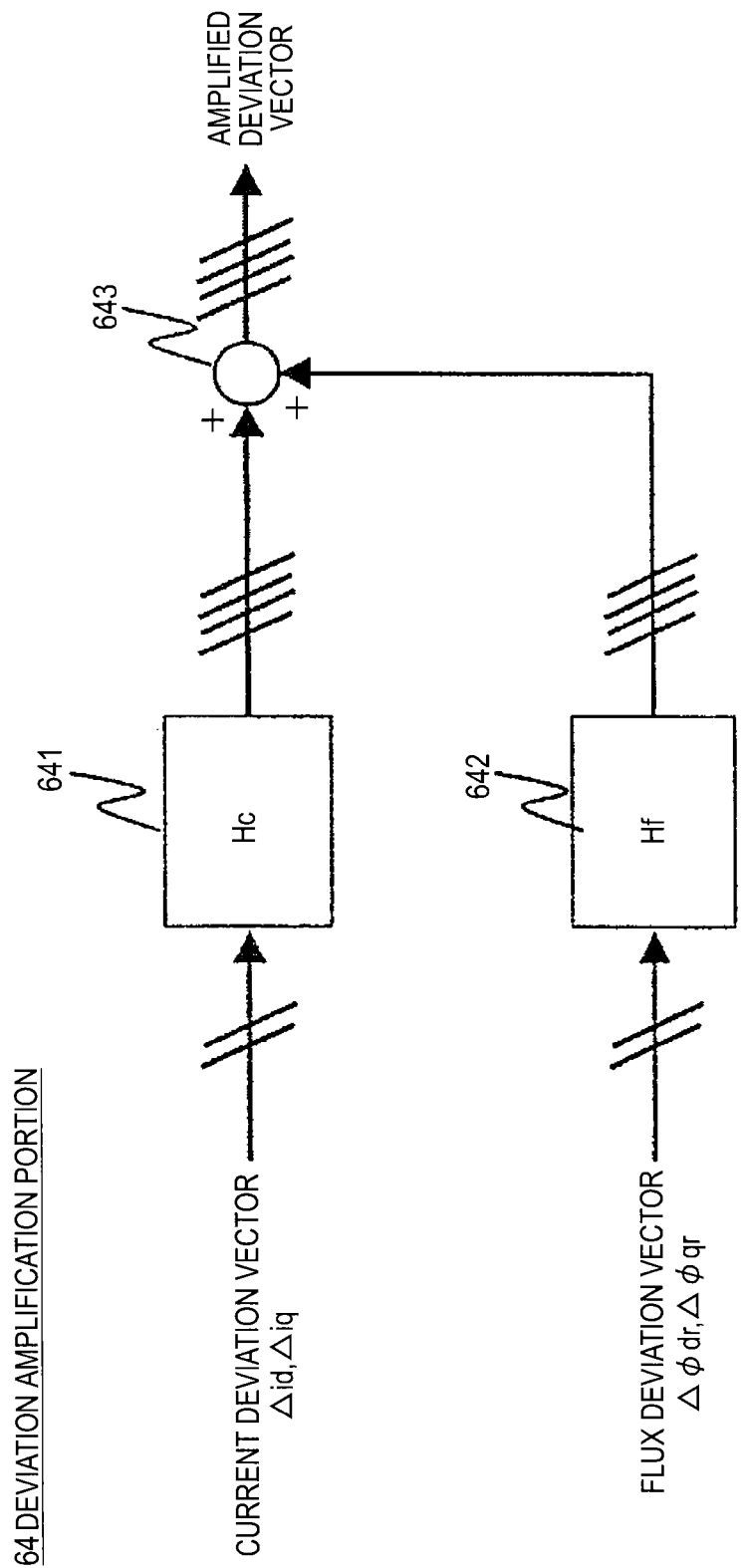
FIG. 13 is a schematic configuration view showing an internal configuration of a deviation amplification portion 64 of the second embodiment.

FIG. 13 is a view showing a configuration of the deviation amplification portion 64. A gain matrix 641 of FIG. 13 outputs a result obtained by multiplying (eids, eiqs)$^T$, which is a transposed matrix of the current deviation vector (eids, eiqs), by a matrix Hc, and a gain matrix 642 outputs a result obtained by multiplying the flux deviation vector (eϕdr, eϕqr)$^T$ by a matrix Hf. The matrices Hc and Hf are gain matrices defined by Equation (17) as below, and h11 through h44 in Equation (17) below are amplification gains. Herein, h11 through h44 are values that can be set arbitrarily. For example, h11 through h42 in the matrix Hc are set so that values of the respective amplification gains are changed with an estimated speed ωr0 as is set forth in FIG. 9 of PTL 3 (Japanese Patent No. 4672236). Likewise, values of h13 through h44 of the gain matrix Hf may be set so that values of the respective amplification gains are changed with the estimated speed ωr0. In this case, as is shown in FIG. 14, it is configured in such a manner that the estimated speed ωr0 is also outputted from the adaptive observation portion 65 described below so that the estimated speed ωr0 is inputted to the gain matrices 644 and 645 in the deviation amplification portion 64.

[Math. 17]

$$Hc = \begin{pmatrix} h_{11} & h_{12} \\ h_{21} & h_{22} \\ h_{31} & h_{32} \\ h_{41} & h_{42} \end{pmatrix}, Hf = \begin{pmatrix} h_{13} & h_{14} \\ h_{23} & h_{24} \\ h_{33} & h_{34} \\ h_{43} & h_{44} \end{pmatrix} \quad (17)$$

Figure 14:
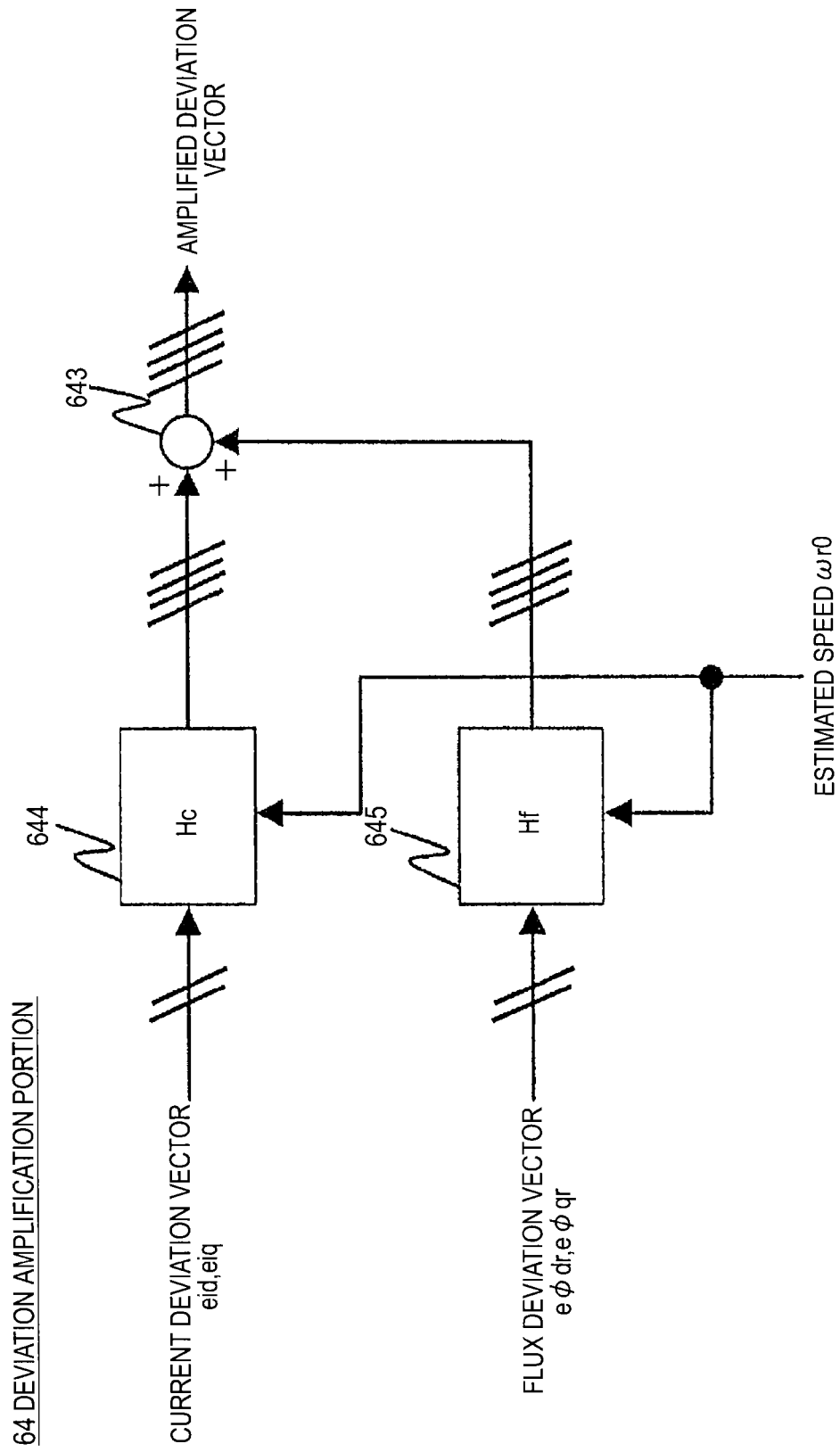
FIG. 14 is a schematic configuration view showing another example of the configuration of the deviation amplification portion 64 of the second embodiment.

An adder-subtractor 643 outputs an amplified deviation vector (e1, e2, e3, e4)$^T$ by adding output vectors of the gain matrix 641 and the gain matrix 642 of FIG. 13 or output vectors of the gain matrix 644 and the gain matrix 645 of FIG. 14.

Regarding the estimated speed and the estimated magnetic-pole position outputted from the adaptive observation portion 65 described below, because a speed and a position can be estimated satisfactorily at high rotations without using a flux deviation vector, which is a deviation between the detection flux vector and the estimated flux vector, in a case where an absolute value of the estimated speed is large, values of h13 through h44 in the gain matrix 642 or the gain matrix 645 are set to zero, so that an output of the gain matrix 642 or the gain matrix 645 becomes zero in a high rotation range. Consequently, an amount of computation can be reduced by stopping a computation by the flux vector detection portion 66. Also, because no high-frequency current is generated by vdh and vqh by making outputs of vdh and vqh from the high-frequency voltage vector generator 33 inside the control means 3 zero, a loss caused by a high-frequency current can be eliminated.

Figure 15:
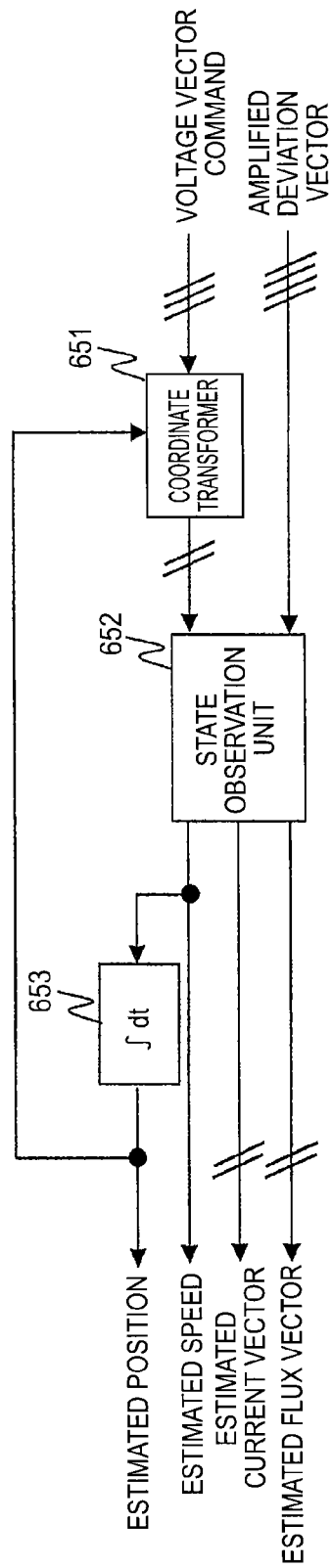
FIG. 15 is a schematic configuration view showing an internal configuration of an adaptive observation portion 65 of the second embodiment.

The adaptive observation portion 65 is, as is shown in FIG. 15, formed of a coordinate transformer 651, a state observation unit 652, and an integration unit 853.

An operation of the adaptive observation portion 65 is described first. Let R be an armature resistance of the AC rotating machine 1, Ld be an armature inductance in the d-axis direction, Lq be an armature inductance in the q-axis direction, ωr0 be an estimated speed, and ω be an power-supply angular frequency. Then, matrices A, B, C, D, C1, and C2 are defined by Equation (18) as follows.

[Math. 18]

$$A = \begin{pmatrix} -\frac{R}{L_d} & \omega & 0 & \omega r0 \\ -\omega & -\frac{R}{L_q} & -\omega r0 & 0 \\ 0 & 0 & 0 & \omega - \omega r0 \\ 0 & 0 & -\omega + \omega r0 & 0 \end{pmatrix}, \quad (18)$$

$$B = \begin{pmatrix} 1 & 0 \\ 0 & 1 \\ 0 & 0 \\ 0 & 0 \end{pmatrix}, C1 = \begin{pmatrix} \frac{1}{L_d} & 0 & 0 & 0 \\ 0 & \frac{1}{L_q} & 0 & 0 \end{pmatrix}, C2 = \begin{pmatrix} 0 & 0 & 1 & 0 \\ 0 & 0 & 0 & 1 \end{pmatrix}$$

Also, let ϕds0 and ϕqs0 be a d-axis component and a q-axis component, respectively, of an estimated armature reaction vector on the d-q axis, and vds and vqs be a d-axis component and a q-axis component, respectively, of a voltage instruction vector on the d-q axis. Then, the estimated armature reaction vectors ϕds0 and ϕqs0 and the estimated flux vectors ϕdr0 and qr0 can be obtained in accordance with Equation (19) as follows.

[Math. 19]

$$\frac{d}{dt}\begin{pmatrix} \phi ds0 \\ \phi qs0 \\ \phi dr0 \\ \phi qr0 \end{pmatrix} = A\begin{pmatrix} \phi ds0 \\ \phi qs0 \\ \phi dr0 \\ \phi qr0 \end{pmatrix} + B\begin{pmatrix} vds \\ vqs \end{pmatrix} - \begin{pmatrix} e1 \\ e2 \\ e3 \\ e4 \end{pmatrix} \quad (19)$$

Also, let s be a Laplace operator (differential operator), kp be a proportional gain, and ki be an integral gain. Then, the estimated speed ωr0, which is an internal parameter of the matrix A in Equation (18) above, can be given by Equation (20) as below using current deviation vectors Δids and Δiqs and the estimated flux vectors ϕdr0 and ϕqr0.

[Math. 20]

$$\omega r0 = \left(kp + \frac{ki}{s}\right)(eiqs\phi dr0 - eids\phi qr0) \quad (20)$$

The estimated position θ0 can be obtained by integrating the estimated speed in accordance with Equation (21) as follows.

[Math. 21]

$$\theta 0 = \frac{\omega r0}{s} \quad (21)$$

Also, the estimated current vectors ids0 and iqs0 can be found in accordance with Equation (22) as follows.

[Math. 22]

$$\begin{pmatrix} ids0 \\ iqs0 \end{pmatrix} = C1 \begin{pmatrix} \phi ds0 \\ \phi qs0 \\ \phi dr0 \\ \phi qr0 \end{pmatrix} \quad (22)$$

Likewise, the estimated flux vectors φdr0 and φqr0 can be found in accordance with Equation (23) as follows.

[Math. 23]

$$\begin{pmatrix} \phi dr0 \\ \phi qr0 \end{pmatrix} = C2 \begin{pmatrix} \phi ds0 \\ \phi qs0 \\ \phi dr0 \\ \phi qr0 \end{pmatrix} \quad (23)$$

As has been described above, the estimated position, the estimated current vector, and the estimated flux vector can be calculated in accordance with Equations (10) through (23) above on the basis of the voltage instruction vector, the amplification deviation vector, and the current deviation vector.

In view of the foregoing, a description will now be given to FIG. 15 as a view showing a configuration of the adaptive observation portion 65.

Referring to FIG. 15, a coordinate transformer 651 transforms a three-phase AC voltage instruction vector, which is an output of control means, to voltage instruction vectors vds and vqs on the d-q axis, which is an orthogonal rotating coordinate, and outputs the result to a state observation unit 652.

Figure 16:
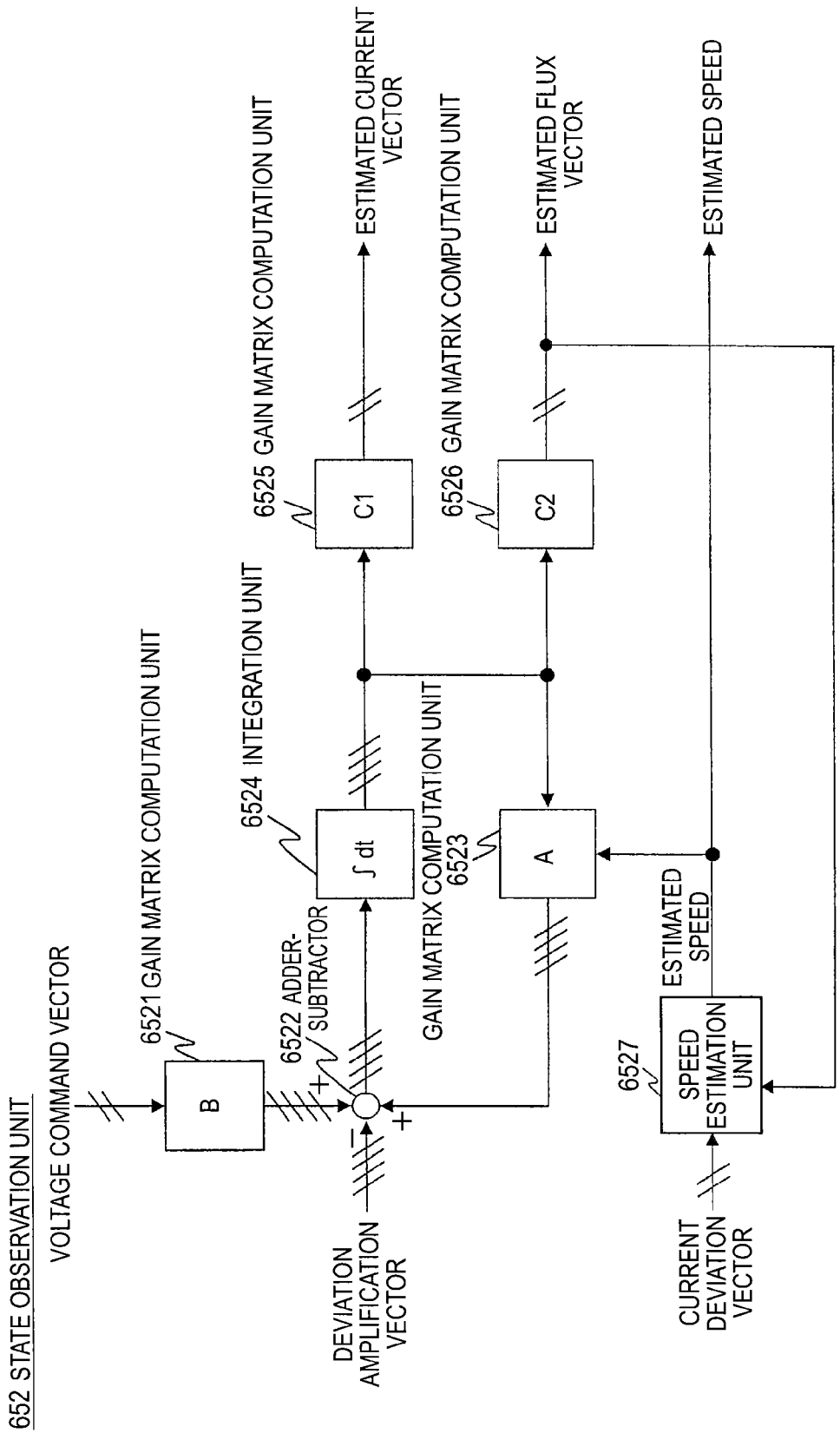
FIG. 16 is a schematic configuration view showing an internal configuration of a state observation unit 652 of the second embodiment.

The state observation unit 652, a detail of which is shown in FIG. 16, outputs a result obtained by multiplying a voltage instruction vector (vds, vqs)$^T$, which is an output of the coordinate transformer 651, by the matrix B by means of a gain matrix computation unit 6521. An adder-subtractor 6522 outputs a vector as a result of addition or subtraction of an output of the gain matrix computation unit 6521, an output of a gain matrix computation unit 6523, and the deviation amplification vector (e1, e2, e3, e4)$^T$. An integration unit 6524 integrates a vector outputted from the adder-subtractor 6522 on an element-by-element basis and outputs the result as a vector (φds0, φqs0, φdr0, φqr0)$^T$. The description above is the part corresponding to the right-hand side of Equation (19) above. The left-hand side of Equation (19) above corresponds to an input part of the integration unit 6524.

A gain matrix computation unit 6525 outputs an estimated current vector (φds0, φqs0)$^T$ by multiplying the vector (φds0, φqs0, φdr0, φqr0)$^T$ by the matrix C1. This part corresponds to Equation (22) above. A gain matrix computation unit 6526 outputs an estimated flux vector (φdr0, φqr0)$^T$ by multiplying the vector (φds0, φqs0, φdr0, φqr0)$^T$ by the matrix C2. This part corresponds to Equation (23) above.

An integration unit 653 of FIG. 15 finds an estimated position θ0 by integrating the estimated speed ωr0, which is an output of the state observation unit 652, as expressed by Equation (21) above.

The above has described an operation of the adaptive observation portion 65.

As has been described, the flux vector detection portion 66 computes the detection flux vector from the alternating current amplitude and the alternating current amplitude instruction, and the detection flux vector is described first.

Figure 17:
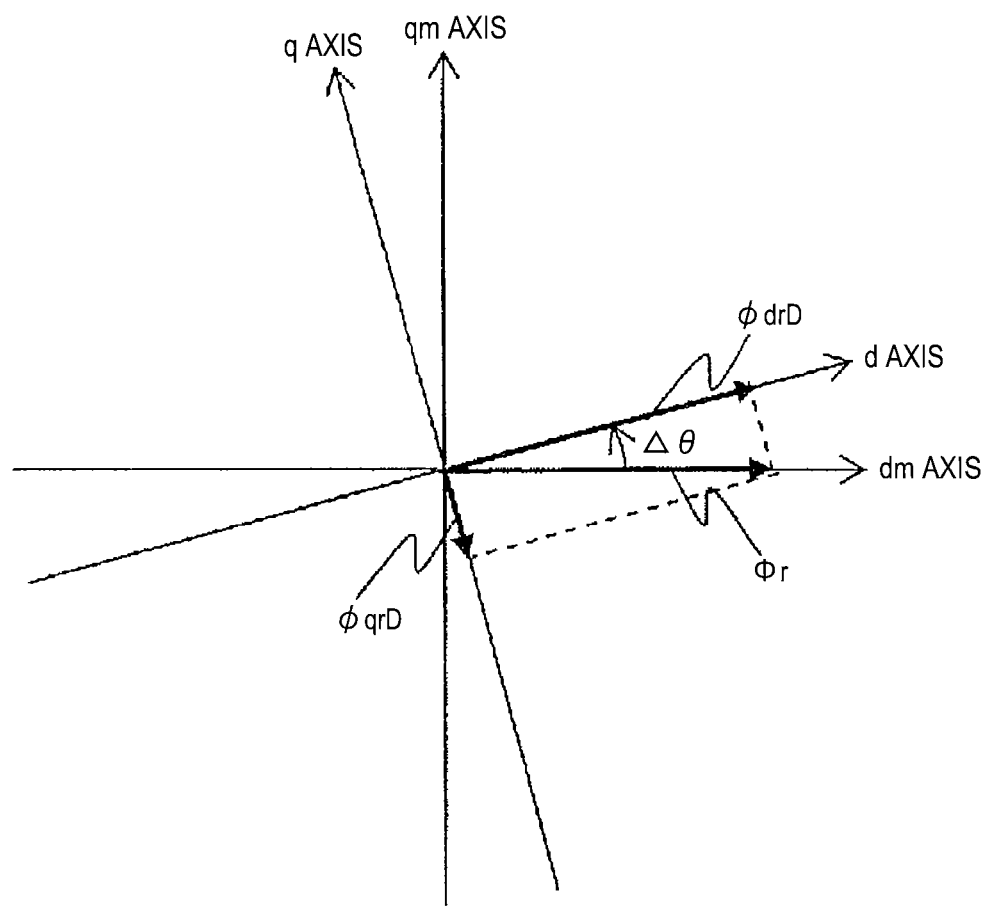
FIG. 17 is a view used to describe an operation of the second embodiment by means of vector.

As is shown in FIG. 17, the rotor flux vector φr is in the same direction as the dm axis. Herein, the rotor flux vector φr is projected to φdrD in a direction parallel to the high-frequency voltage vector, that is, in the d-axis direction, and to φqrD in a direction orthogonal to the high-frequency voltage vector, that is, in the q-axis direction. Given that φdrD and φqrD projected on the d axis and the q axis, respectively, are detection flux vectors. Then, the detection flux vectors can be written in a mathematical formula expressed by Equation (24) as follows.

[Math. 24]

$$\phi drD = |\Phi r|\cos\Delta\theta \quad (24)$$
$$= \phi_f \cos\Delta\theta$$
$$\phi qrD = |\Phi r|\sin\Delta\theta$$
$$= \phi_f \sin\Delta\theta$$

Herein, φf in Equation (24) above is the magnitude of the rotor flux vector φr and can be measured in advance. Hence, in order to compute the detection flux vector in accordance with Equation (24) above, it is sufficient to find Δθ.

In the first embodiment above, a deviation Δθ between the dm axis as the rotor flux direction and the d axis as the estimated magnetic-pole position is expressed by Equation (9) above. Because the adaptive observation portion 65 operates so that Δθ steadily approximates to zero, we obtain 2Δθ≈0 and hence sin 2Δθ≈2Δθ. Accordingly, Equation (25) as below can be obtained from Equation (9) above.

[Math. 25]

$$\Delta\theta = \frac{|i_{qh}|\omega_h(L^2 - l^2)}{2V_h l} \quad (25)$$

Hence, the detection flux vector can be computed in accordance with Equations (24) and (25) above using |iqh|.

An operation under load will now be considered. The above has described that an inductance distribution under load varies with a load current and an error is generated between the d axis indicated by the estimated magnetic-pole position and the dm axis in the rotor flux direction, so that Equation (8) above changes to Equation (13) above. Herein, Equation (13) is developed to Equation (26) as follows.

[Math. 26]

$$|i_{qh}| = \frac{V_h l}{\omega_h(L^2 - l^2)}\{\sin 2\Delta\theta\cos 2\theta_e - \cos 2\Delta\theta \sin 2\theta_e\} \quad (26)$$

Assume that an operation is performed so that Δθ steadily becomes zero, then we obtain 2Δθ≈0. Hence, given sin 2Δθ≈2Δθ and cos 2Δθ≈1, Equation (27) as below can be obtained from Equation (26) above.

[Math. 27]

$$|i_{qh}| = \frac{V_h l}{\omega_h(L^2 - l^2)}2\Delta\theta\cos 2\theta_e - \frac{V_h l}{\omega_h(L^2 - l^2)}\sin 2\theta_e \quad (27)$$

Herein, the right-hand second term of Equation (27) above is equal to Equation (15) above. Hence, Equation (28) as below is obtained by subtracting Equation (27) above from Equation (15) above.

[Math. 28]
$$|i_{qh\_ref}| - |i_{qh}| = 2\Delta\theta\cos2\theta_e \frac{-V_h l}{\omega_h(L^2-l^2)} \quad (28)$$

Equation (29) with respect to $\Delta\theta$ as below can be obtained from Equation (28) above.

[Math. 29]
$$\Delta\theta\cos2\theta_e = \frac{-\omega_h(L^2-l^2)}{2V_h l}(|i_{qh\_ref}|-|i_{qh}|) \quad (29)$$

Because an unknown value cos 2θe is left in Equation (29), this equation cannot be applied to Equation (24) above intact.

Accordingly, cos 2θe is computed using a parallel component idh of a high-frequency current. The parallel component idh of a high-frequency current is expressed by Equation (30) as below from Equation (12) above and the magnitude (amplitude) |idh| is expressed by Equation (31) as below.

[Math. 30]
$$i_{dh} = \frac{-V_h(L+l\cos2(\Delta\theta-\theta_e))}{\omega_h(L^2-l^2)}\cos\omega_h t \quad (30)$$

[Math. 31]
$$|i_{dh}| = -\frac{V_h L}{\omega_h(L^2-l^2)} - \frac{V_h l}{\omega_h(L^2-l^2)}\cos2(\Delta\theta-\theta_e) \quad (31)$$

Assume that an operation is performed so that Δθ steadily becomes zero, Equation (32) as below is obtained from Δθ≈0,

[Math. 32]
$$|i_{dh}| = -\frac{V_h L}{\omega_h(L^2-l^2)} - \frac{V_h l}{\omega_h(L^2-l^2)}\cos2\theta_e \quad (32)$$

The right-hand side of Equation (32) above is known except for cos 2θe and |idh| can be computed from a high-frequency component of the detection current vector as with |iqh|. That is, cos 2θe can be computed online in accordance with Equation (33) as follows.

[Math. 33]
$$\cos2\theta_e = -\frac{\omega_h(L^2-l^2)}{V_h l}|i_{dh}| - \frac{L}{l} \quad (33)$$

Hence, the detection flux vector expressed by Equation (24) above can be computed by computing Δθ in accordance with Equations (29) and (33) above.

Figure 18:
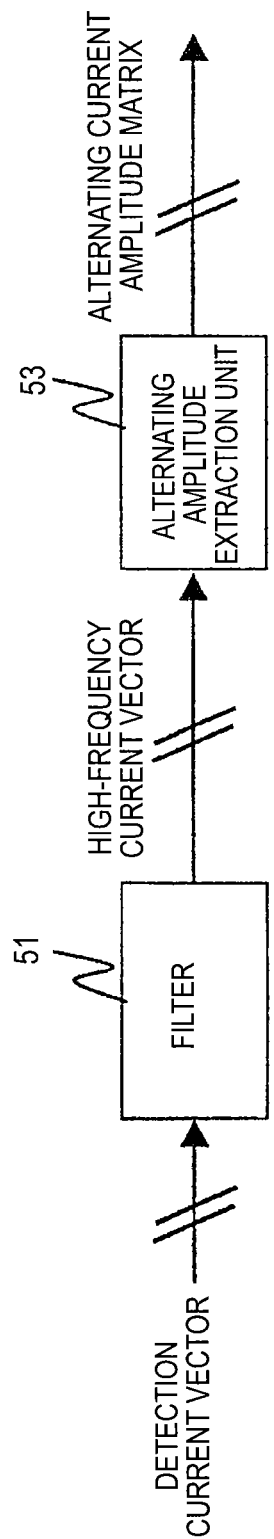
FIG. 18 is a schematic configuration view showing an internal configuration of alternating current amplitude computation means 5 of the second embodiment.
Figure 19:
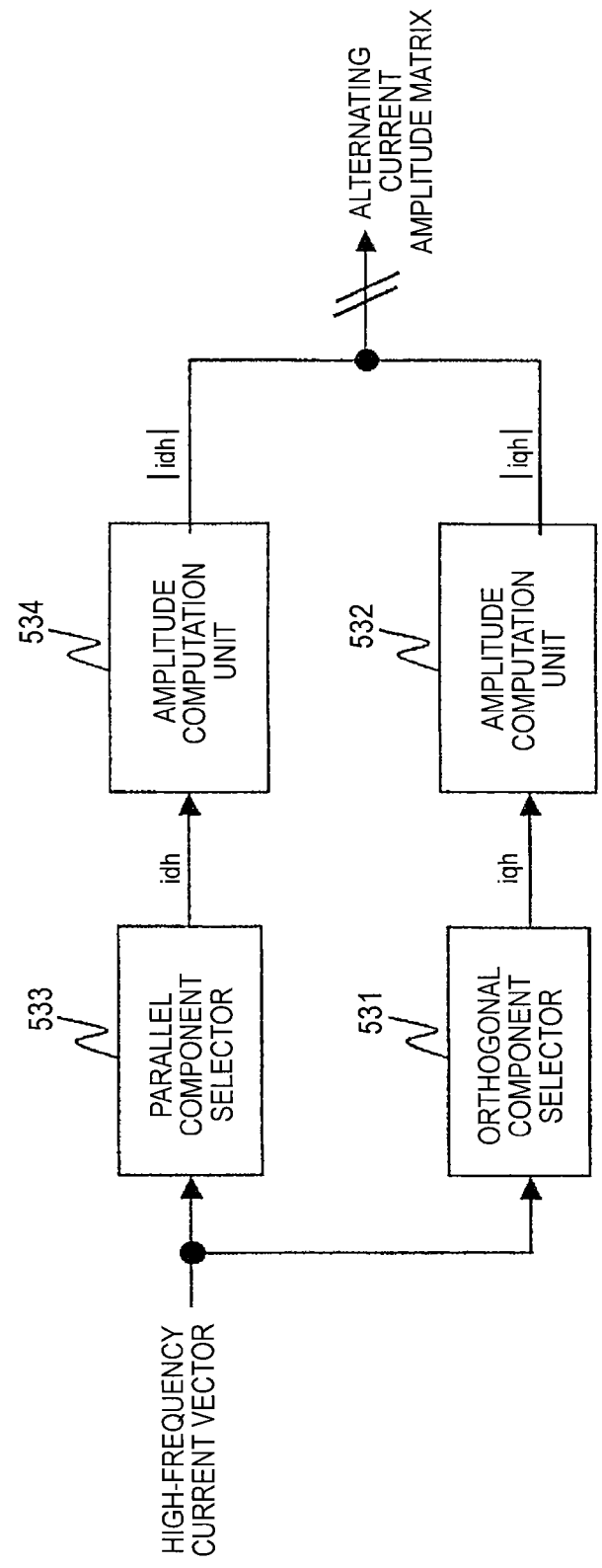
FIG. 19 is a schematic configuration view showing an internal configuration of an alternating amplitude extraction unit 53 of the second embodiment.

In this case, as is shown in FIG. 18, the alternating current amplitude computation means 5 outputs an alternating current amplitude matrix (|idh|, |iqh|) from the high-frequency current vector by means of an alternating amplitude extraction unit 53. As is shown in FIG. 19, the alternating amplitude extraction unit 53 has a parallel component selector 533 in addition to the orthogonal component selector 531 and the amplitude computation unit 532. The parallel component selector 533 selects idh by multiplying the high-frequency current vector by $(1, 0)^T$. The amplitude computation unit 532 calculates the amplitude |idh| in accordance with Equation (34) above.

[Math. 34]
$$|i_{dh}| = \sqrt{\frac{2}{T}\int_0^T i_{dh}^2 dt} \quad (34)$$

Owing to the configuration as above, a deviation Δθ between the dm axis as the rotor flux direction and the d axis as the estimated magnetic-pole position can be computed from the high-frequency current amplitude and the high-frequency current amplitude instruction. Hence, the detection flux vector can be computed without the need to preliminarily find the magnetic-pole position and an amount of computation can be therefore reduced.

Also, even in an operation under load in which an error appears in the estimated magnetic-pole position, by finding the detection flux vector from the alternating current amplitude and the alternating current amplitude instruction, finding the flux deviation vector, which is a deviation between the detection flux vector and the estimated flux vector, and finding a current deviation vector, which is a deviation between the detection current vector and the estimated current vector, so that the magnetic-pole position is estimated by the adaptive observation portion 65 from the amplified deviation vector obtained by amplifying the flux deviation vector, the magnetic-pole position can be estimated in all of the speed regions without influences of a load-induced error in estimation of the magnetic-pole position.

Third Embodiment

In the first embodiment above, the alternating current amplitude instruction generation means 7 generates the alternating current amplitude instruction from the current vector instruction. The detection current vector of the AC rotating machine 1 is controlled by the control means 3 so as to steadily coincide with the current vector instruction. Hence, the alternating current amplitude instruction may be generated from the detection current vector.

Figure 20:
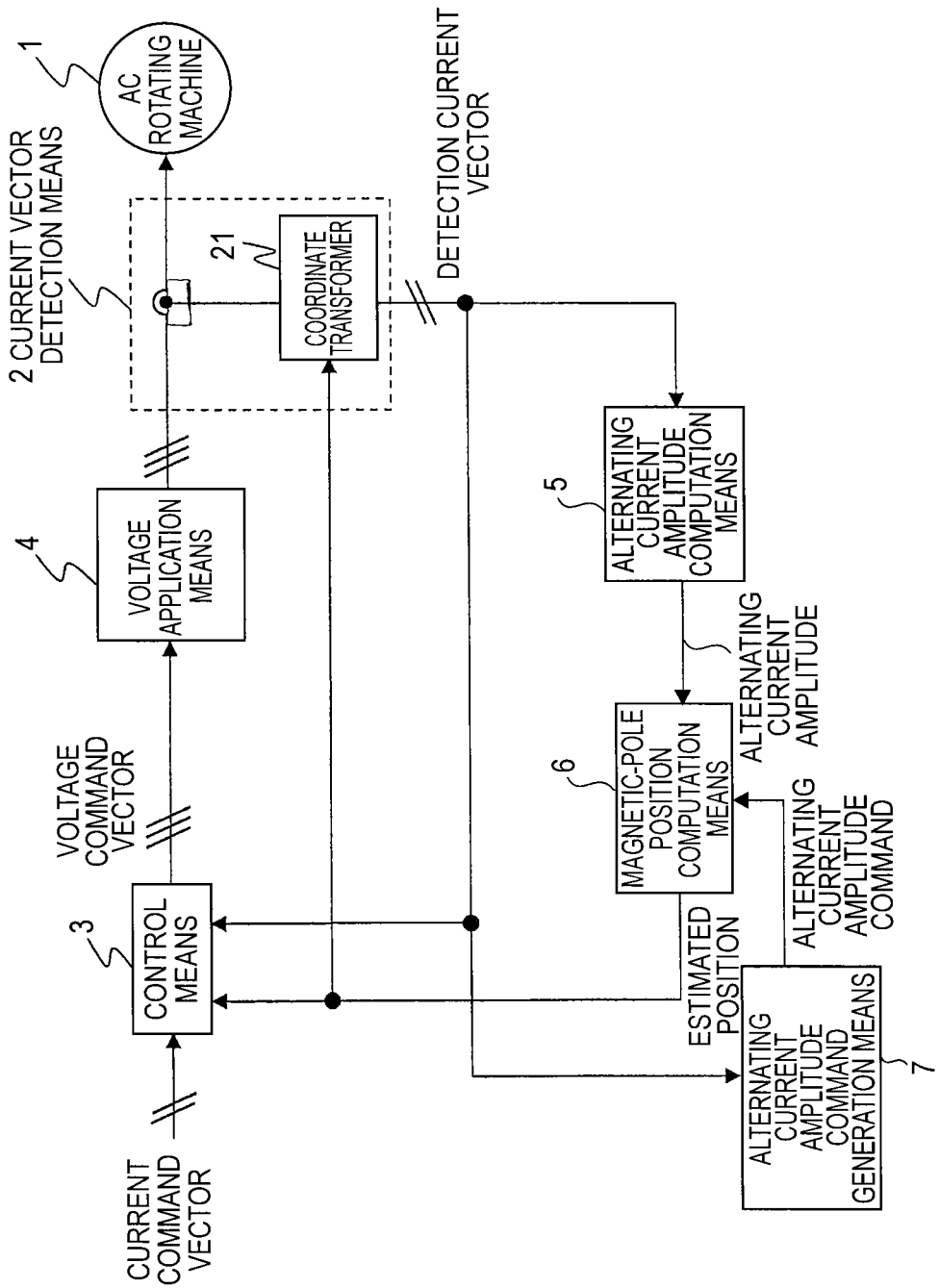
FIG. 20 is a view showing an overall configuration of a control device of an AC rotating machine of a third embodiment.

FIG. 20 shows a configuration of a control device of an AC rotating machine of this embodiment. Referring to FIG. 20, the alternating current amplitude instruction generation means 7 generates the alternating current amplitude instruction from the detection current vector. The rest is the same as the configuration of the first embodiment above.

The alternating current amplitude instruction generation means 7 generates the alternating current amplitude instruction by multiplying the detection current vector (ids, iqs) by an amplification value $(Kd, Kq)^T$. The amplification value (Kd, Kq) can take a simple constant value or have a table value according to the current vector instruction, in which case the AC current amplitude instruction value can be more accurate. Also, by setting as Kd=0, the alternating current instruction may be generated from only a torque component of the detection current vector.

As has been described above, the alternating current amplitude instruction generation means 7 can compute the magnetic-pole position using the alternating current amplitude instruction coinciding with an internal state of the AC rotating machine by generating the alternating current amplitude instruction using the detection current vector.

Figure 21:
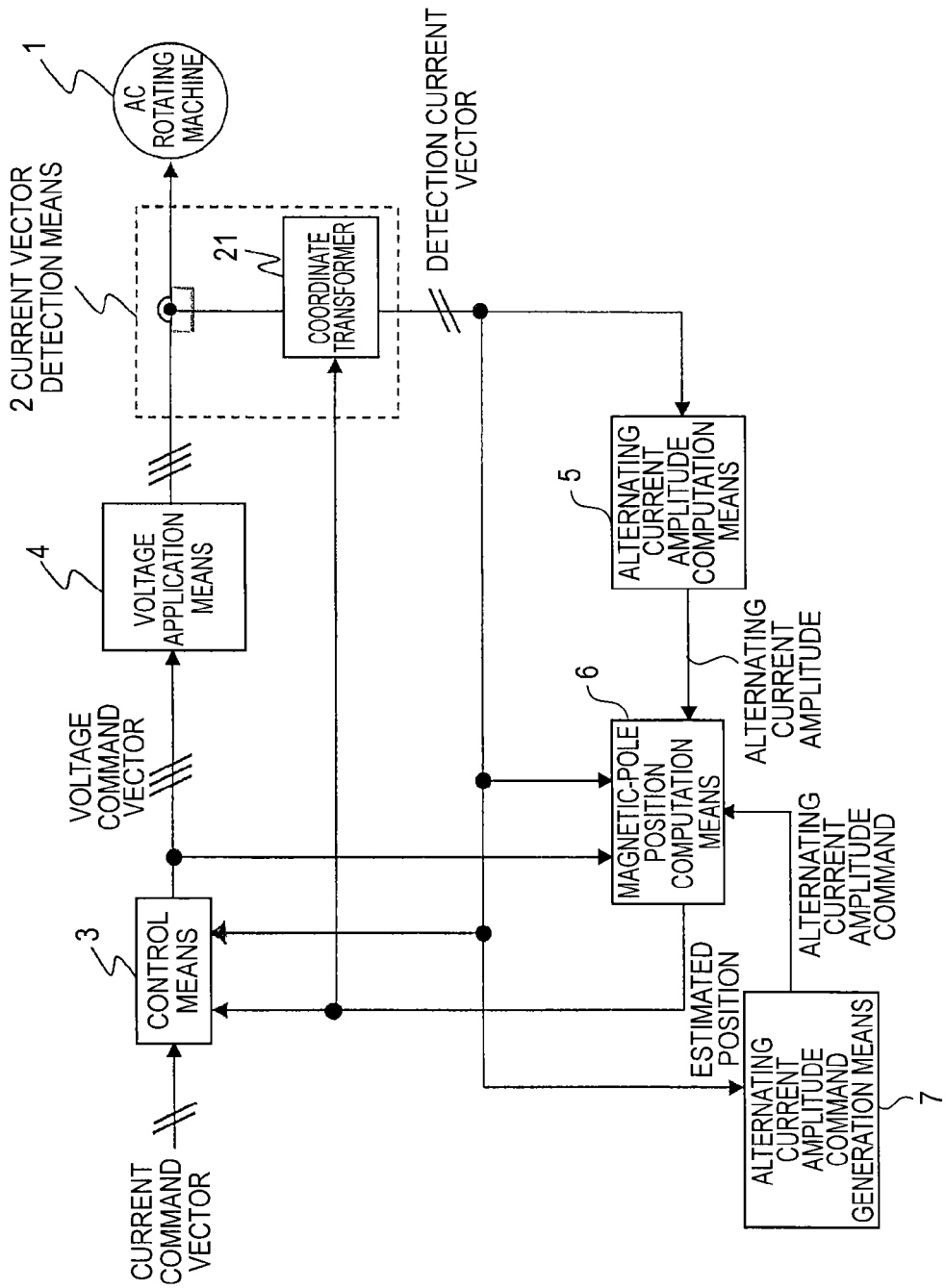
FIG. 21 is a view showing another example of the configuration of the control device of the AC rotating machine of the third embodiment.

It should be appreciated that the alternating current amplitude instruction generation means 7 described in the third embodiment is also applicable in the second embodiment above. In such a case, the configuration is as shown in FIG. 21 and the alternating current amplitude instruction generation means 7 is formed in the same manner as in the third embodiment.

Fourth Embodiment

The control devices of the AC rotating machine according to the first through third embodiments apply a high-frequency voltage in the dm-axis direction, which is a rotor flux of the AC rotating machine. However, in an AC rotating machine in which a ratio of Ld and Lq (hereinafter, referred to as the saliency ratio) is large, the axis that suppresses the occurrence of a torque by a high-frequency voltage is not limited to the dm axis.

This embodiment will describe a control device of an AC rotating machine configured to apply a high-frequency voltage in a direction in which the occurrence of a torque by a high-frequency alternating voltage is suppressed even for an AC rotating machine having a large saliency ratio.

A description is first given to a cause of the occurrence of a torque by a high-frequency alternating voltage and a method of suppressing the occurrence of a torque.

In a case where the AC rotating machine 1 is a synchronous machine using permanent magnets, a generated torque T is known to be expressed by Equation (35) as follows.

[Math. 35]
$$\tau = P_m \{\phi - (L_q - L_d) i_d\} i_q \tag{35}$$

where Pm is the number of pole pairs of the AC rotating machine 1, $i_d$ is a current in the dm-axis direction, and $i_q$ is a current in the qm-axis direction.

Figure 22:
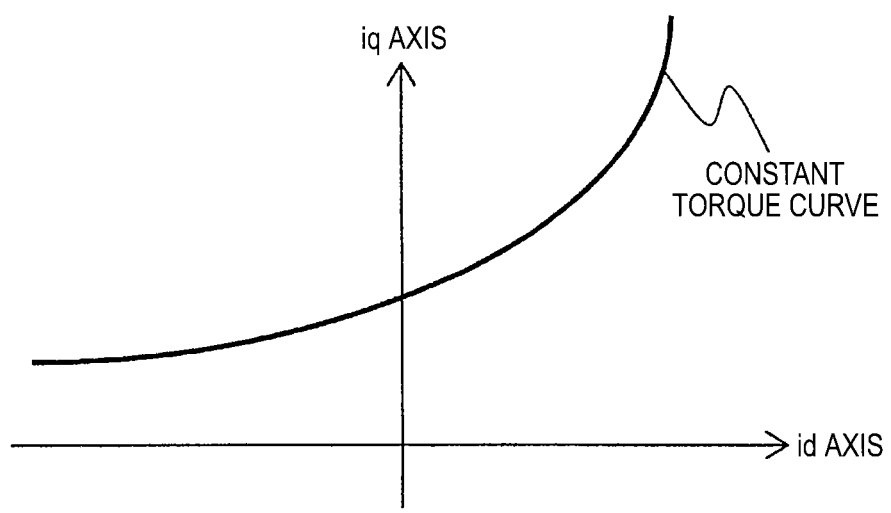
FIG. 22 is a view showing a constant torque curve of an AC rotating machine of a fourth embodiment.

By modifying Equation (35) above to Equation (36) as below and giving a constant value to the torque τ, iq can be expressed as a hyperbolic line of id. A locus (constant torque curve) of a current vector on the (id, iq) axis in this instance is the one as shown in FIG. 22.

[Math. 36]
$$i_q = \frac{\tau}{P_m \{\phi - (L_q - L_d) i_d\}} \tag{36}$$

The constant torque curve referred to herein means that a torque is constant at any current value on the curve and the torque does not vary even when a current vector moves on the curve. In other words, when the current vector fluctuating with a high-frequency alternating voltage is on this curve, a torque by the high-frequency alternating voltage is not generated.

Figure 23:
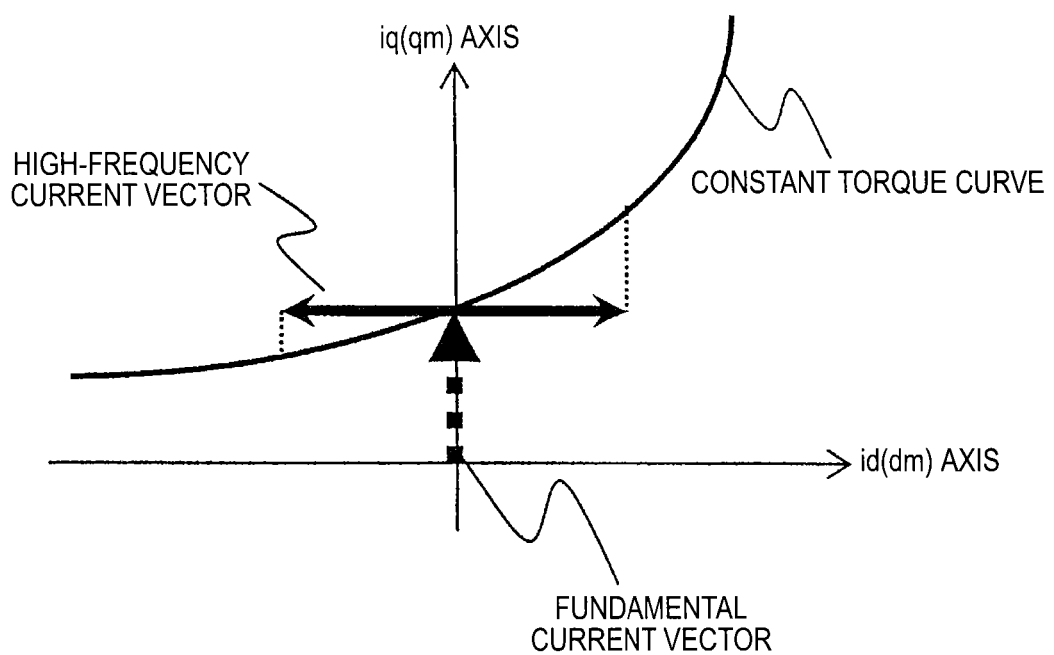
FIG. 23 is a view used to describe an operation of the fourth embodiment.

Assume that a fundamental current vector is applied so as to drive the AC rotating machine 1 and a torque is generated. Then, there is a constant torque curve of this torque. In this instance, when a high-frequency alternating voltage is applied in the dm-axis direction, the locus of the high-frequency current vector is the high-frequency current vector shown in FIG. 23. Because this vector locus is not on the constant torque curve, a torque varies. Accordingly, vibrations and noises may possibly be generated in the rotating machine.

Figure 24:
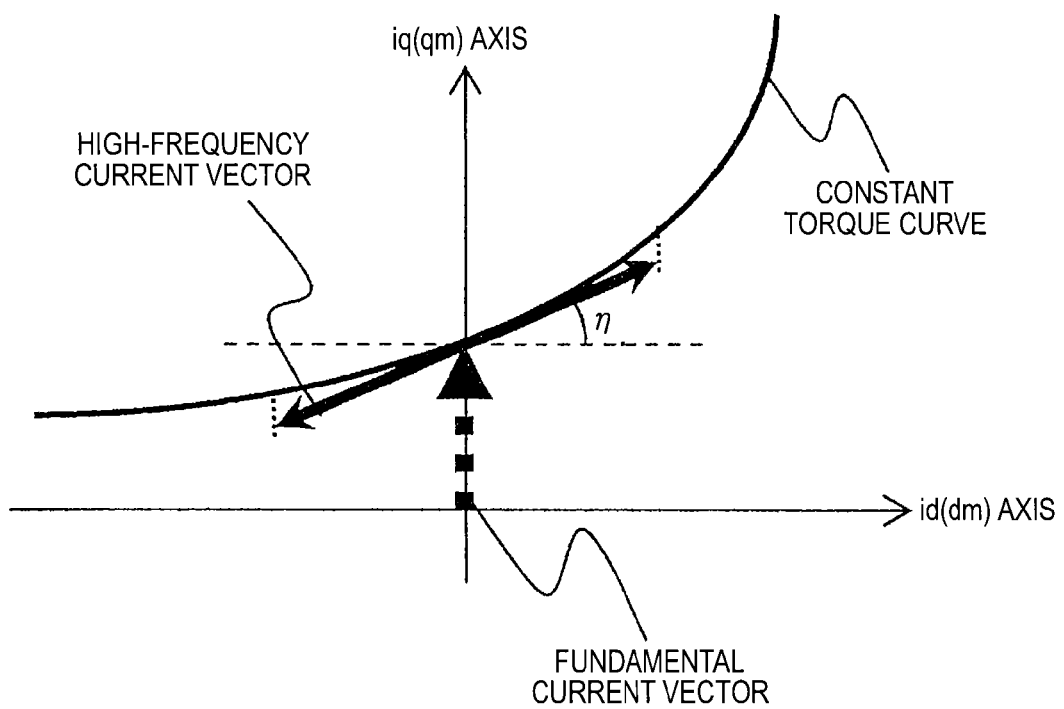
FIG. 24 is a view used to describe an operation of the fourth embodiment.

In order to overcome this inconvenience, by approximating the vector locus of the high-frequency current to a tangential line to the constant torque curve as is shown in FIG. 24, a variance of a torque by the high-frequency current vector can be suppressed. By differentiating Equation (36) above with id, an inclination of the tangential line is obtained in accordance with Equation (37) as below. Further, the inclination can be expressed by Equation (38) as below by modifying Equation (37) below using Equation (35) above.

[Math. 37]
$$\frac{di_q}{di_d} = \frac{\tau(L_q - L_d)}{P_m \{\phi - (L_q - L_d)i_d\}^2} \tag{37}$$

[Math. 38]
$$\frac{di_q}{di_d} = \frac{(L_q - L_d)i_q}{\{\phi - (L_q - L_d)i_d\}} \tag{38}$$

Also, let η be a deviation between the dm axis and a tangential line to the constant torque curve, then a deviation η in a given fundamental current vector (id1, iq1) is expressed by Equation (39) as follows,

[Math. 39]
$$\eta = \tan^{-1}\left(\frac{(L_q - L_d)i_{q1}}{\phi - (L_q - L_d)i_{d1}}\right) \tag{39}$$

In other words, by applying the high-frequency voltage to an axis displaced by η from the dm axis, it becomes possible to suppress the occurrence of a torque by the high-frequency current vector.

The above has described the cause of the occurrence of a torque by the high-frequency voltage and a method of suppressing the occurrence of a torque.

In the first through third embodiments above, the high-frequency voltage vector instruction (vdh, vqh) is merely changed in order to apply a high-frequency voltage to an axis η away from the dm axis. To be more specific, this application can be achieved by giving the high-frequency voltage vector instruction expressed by Equation (40) as follows.

[Math. 40]
$$v_{dh} = Vh \cos\eta \sin\omega_h t$$
$$v_{qh} = Vh \sin\eta \sin\omega_h t \tag{40}$$

A method of setting |iqh_ref| in this instance will now be described.

When the high-frequency voltage vector instruction is applied to a dc axis η away from the dm axis, Δθ in Equation (13) above can be replaced with (η+Δθ1) using an instantaneous deviation Δθ1 from the dc axis, and a high-frequency current amplitude of the qm axis is expressed by Equation (41) as follows.

[Math. 41]
$$|i_{qh}| = \frac{V_h l}{\omega_h(L^2 - l^2)} \sin2(\Delta\theta_1 + \eta - \theta_e) \tag{41}$$

Because the instantaneous error Δθ1 converges to zero, Equation (42) as below can be obtained eventually.

[Math. 42]

$$|i_{qh}| = -\frac{V_h l}{\omega_h (L^2 - l^2)} \sin 2(\eta + \theta_e) \quad (42)$$

Hence, Equation (42) above is the same as Equation (14) above except that merely (2η) is added to the right-hand sine term and the rest is the same as the configurations of the first through third embodiments above. Accordingly, even a case where a direction in which to apply the high-frequency voltage vector instruction is changed from the dm axis is applicable to the first through third embodiments above by finding |iqh_ref| through electromagnetic analysis or preliminary measurement using the actual machine. Owing to the configuration as above, the high-frequency voltage can be applied to a direction in which the occurrence of a torque is suppressed.

As has been described above, even in an AC rotating machine with a large saliency ratio, by setting an axis to which is applied a high-frequency voltage in a tangential direction to the constant torque curve, vibrations and noises of the rotating machine due to a torque fluctuation caused by a high-frequency voltage can be suppressed.

Reference Signs List
1: AC rotating machine, 2: current vector detection means,
3: control means, 4: voltage application means,
5: alternating current amplitude computation means,
6: magnetic-pole position computation means,
7: alternating current amplitude instruction generation means,
21, 35, and 651: coordinate transformer,
31, 34, 512, 61, 643, 6522: adder-subtractor,
32: current controller,
33: high-frequency voltage vector generator, 51: filter,
52: orthogonal component extraction unit, 511: notch filter,
521 and 531: orthogonal component selector,
522, 532, and 534: amplitude computation unit,
533: parallel component selector,
62: magnetic-pole position estimation unit,
63: deviation vector computation unit,
64: deviation amplification unit,
65: adaptive observation portion,
66: flux vector detection portion,
641, 642, 644, and 645: gain matrix
652: state observation unit, 653: integration unit,
6521 and 6523 through 6526: gain matrix computation unit,
6527: speed estimation unit

The invention claimed is:

1. A control device of an AC rotating machine, comprising:
current vector detection means for detecting a current vector of the AC rotating machine;
control means for receiving a current vector instruction and the detection current vector as inputs and outputting a voltage vector instruction obtained by adding a fundamental voltage vector instruction to drive the AC rotating machine and an alternating voltage vector instruction alternating to an arbitrary axis;
voltage application means for applying a voltage to the AC rotating machine according to the voltage vector instruction;
alternating current amplitude computation means for receiving a current vector detected by the current vector detection means as an input and computing an alternating current amplitude of at least one of a parallel component and an orthogonal component with respect to the alternating voltage vector instruction;
alternating current amplitude instruction generation means for generating an alternating current amplitude instruction from the current vector instruction or the detection current vector; and
magnetic-pole position computation means for computing an estimated magnetic-pole position of the AC rotating machine,
the control device being characterized in that the magnetic-pole position computation means computes the estimated magnetic-pole position so that the alternating current amplitude coincides with the alternating current amplitude instruction.

2. The control device of an AC rotating machine according to claim 1, wherein the control means is formed of:
an adder-subtractor that subtracts the detection current vector from the current vector instruction;
a current controller that generates the fundamental voltage vector instruction by performing control so that an output of the adder-subtractor has no deviation between the current vector instruction and the detection current vector;
an alternating voltage vector generator that generates an alternating voltage vector instruction on a d-q axis; and
an adder-subtractor that generates the voltage vector instruction by adding the fundamental voltage vector instruction and the alternating voltage vector instruction.

3. The control device of an AC rotating machine according to claim 2, wherein:
the alternating current amplitude instruction generation means computes the alternating current amplitude instruction from a torque component of the detection current vector or the current vector instruction.

4. The control device of an AC rotating machine according to claim 1, wherein the magnetic-pole position computation means is formed of:
an adder-subtractor that outputs a deviation between the alternating current amplitude instruction and the alternating current amplitude; and
a magnetic-pole position estimation unit that outputs an estimated magnetic-pole position from the deviation.

5. The control device of an AC rotating machine according to claim 1, wherein:
the alternating current amplitude, the alternating current amplitude instruction, the voltage vector instruction, and the detection current vector are inputted into the magnetic-pole position computation means.

6. The control device of an AC rotating machine according to claim 1, wherein:
the magnetic-pole position computation means has,
a flux vector detection portion that computes a detection flux vector from the alternating current amplitude and the alternating current amplitude instruction,
an adaptive observation portion that outputs an estimated current vector, an estimated flux vector, and an estimated magnetic-pole position of the AC rotating machine,
a deviation vector computation portion that outputs a current deviation vector, which is a deviation between the estimated current vector and the detection current vector, and a flux deviation vector, which is a deviation between the estimated flux vector and the detection flux vector, and
a deviation amplification portion that amplifies the current deviation vector and the flux deviation vector and outputs a result as an amplified deviation vector to the adaptive observation portion; and the estimated magnetic-pole position outputted from the adaptive observation portion is computed on the basis of the estimated current vector, the estimated flux vector, the amplified deviation vector, and the voltage vector instruction.

7. The control device of an AC rotating machine according to claim 1, wherein:

the alternating current amplitude instruction generation means computes the alternating current amplitude instruction from a torque component of the detection current vector or the current vector instruction.

8. The control device of an AC rotating machine according to claim 1, wherein:

the alternating voltage vector instruction alternates to an axis on which no torque is generated during application.

9. The control device of an AC rotating machine according to claim 8, wherein:

when an arbitrary constant torque is generated, the control means performs control so that the alternating voltage vector instruction is in a tangential direction to a locus of the current vector on a d-q axis.

* * * * *